(12) United States Patent
Wilmer

(10) Patent No.: US 11,980,891 B2
(45) Date of Patent: *May 14, 2024

(54) METERING HEAD, METERING DEVICE COMPRISING A METERING HEAD, AND METHOD FOR METERING BY MEANS OF A METERING HEAD

(71) Applicant: Eppendorf AG, Hamburg (DE)

(72) Inventor: Jens Wilmer, Ahrensburg (DE)

(73) Assignee: Eppendorf Group SE & Co. KG, Hamburg (DE)

( * ) Notice: Subject to any disclaimer, the term of this patent is extended or adjusted under 35 U.S.C. 154(b) by 110 days.

This patent is subject to a terminal disclaimer.

(21) Appl. No.: 17/722,801

(22) Filed: Apr. 18, 2022

(65) Prior Publication Data

US 2022/0241793 A1 Aug. 4, 2022

Related U.S. Application Data

(63) Continuation of application No. 16/309,042, filed as application No. PCT/EP2017/066190 on Jun. 29, 2017, now Pat. No. 11,305,292.

(30) Foreign Application Priority Data

Jun. 29, 2016 (DE) ..................... 10 2016 111 910.5

(51) Int. Cl.
*B01L 3/02* (2006.01)
*B01L 9/00* (2006.01)
*G01N 35/10* (2006.01)

(52) U.S. Cl.
CPC ............ *B01L 9/543* (2013.01); *B01L 3/0279* (2013.01); *G01N 35/1016* (2013.01);
(Continued)

(58) Field of Classification Search
None
See application file for complete search history.

(56) References Cited

U.S. PATENT DOCUMENTS 7,897,111 B2  3/2011  Naumann
8,354,079 B2  1/2013  Naumann
(Continued)

FOREIGN PATENT DOCUMENTS

DE    19917375 C2    9/2001
DE    200410003433 A1    8/2005
(Continued)

*Primary Examiner* — P. Kathryn Wright
(74) *Attorney, Agent, or Firm* — Edwin E. Voigt, II

(57) ABSTRACT

A metering head for a metering machine having a carrier having parallel attachments for picking up pipette tips wherein each attachment has a tube having a supporting protrusion at the bottom end at least one sleeve which surrounds the tube and can be axially shifted on the tube, and at least one elastomer O-ring which surrounds the tube a pressure plate above the sleeves having a plurality of first holes through which the tubes extend, wherein the pressure plate can be shifted along the tubes from a release position into a clamping position where the sleeves are pressed, at the bottom ends, against the adjacent O-rings, and the O-rings are expanded to clamp pipette tips; and a first shifting apparatus connected to the pressure plate moving the pressure plate between the release position and clamping position.

30 Claims, 18 Drawing Sheets

(52) U.S. Cl.
CPC ....... *G01N 35/1074* (2013.01); *G01N 35/109* (2013.01); *B01L 3/0227* (2013.01); *B01L 2200/023* (2013.01); *B01L 2200/0605* (2013.01); *B01L 2200/0689* (2013.01); *B01L 2300/0829* (2013.01)

(56) References Cited

U.S. PATENT DOCUMENTS

| | | | |
|---|---|---|---|
| 2002/0053245 A1 | 5/2002 | Carl | |
| 2006/0233669 A1* | 10/2006 | Panzer | B01L 3/0279 422/400 |
| 2008/0138249 A1 | 6/2008 | Itoh | |
| 2017/0361315 A1* | 12/2017 | Guzman | G01N 35/10 |
| 2018/0280967 A1* | 10/2018 | Gilchrist | G01N 35/1074 |

FOREIGN PATENT DOCUMENTS

| | | |
|---|---|---|
| DE | 102004003433 B4 | 3/2006 |
| DE | 202011000837 U1 | 6/2011 |
| EP | 0737726 B1 | 7/1999 |
| EP | 1407861 B1 | 4/2008 |
| EP | 2735369 A1 | 5/2014 |
| JP | H06320021 A | 11/1994 |
| JP | 2012247201 A | 12/2012 |
| WO | 01/56695 A1 | 8/2001 |
| WO | 2005/113149 A1 | 12/2005 |
| WO | 2007/022667 A1 | 3/2007 |

\* cited by examiner

METERING HEAD, METERING DEVICE COMPRISING A METERING HEAD, AND METHOD FOR METERING BY MEANS OF A METERING HEAD

CROSS-REFERENCE TO RELATED APPLICATIONS

This application is a continuation application from U.S. patent application Ser. No. 16/309,042 filed Dec. 11, 2018, now U.S. patent Ser. No. 11/305,292 issued on Apr. 19, 2022, which claims priority to PCT/EP patent application number 2017/066190, filed Jun. 29, 2017, the entire contents all of which being incorporated by reference herein in their entireties.

BACKGROUND OF THE INVENTION

The invention relates to a metering head for simultaneously picking up a plurality of pipette tips, a metering device comprising a metering head for simultaneously picking up a plurality of pipette tips, and a method for metering liquids by means of a metering head for simultaneously picking up a plurality of pipette tips.

BRIEF SUMMARY OF THE INVENTION

Metering devices ("pipetting devices") with a metering head ("pipetting head") for simultaneously picking up a plurality of pipette tips are used in particular in medical, biological, biochemical and chemical laboratories for metering liquids.

Metering heads for simultaneously picking up a plurality of pipette tips have a plurality of adjacently arranged parallel attachments that are inserted in the mounting openings in the top end of the pipette tips. Liquid is drawn into the pipette tips and discharged therefrom through a tip opening at the bottom end of the pipette tips.

After use, the pipette tips can be detached from the attachments and exchanged for fresh pipette tips. In this way, contamination of the subsequent meterings can be avoided. Pipette tips consisting of plastic are economically available for single use.

When designed as an air cushion pipetting device, at least one displacement apparatus is integrated in the pipetting device and connected via connecting holes in the attachments to communicate with the pipette tips. By means of the displacement apparatus, an air cushion can be shifted by the displacement apparatus so that the liquid is sucked into, and ejected out of, the pipette tips. The displacement apparatuses are generally cylinders with plungers that are movable therein.

However, displacement apparatuses are also known with a displacement chamber and at least one deformable wall, wherein a deformation of the wall causes the displacement of the air cushion.

In the embodiment as a direct displacement pipetting device, a small plunger is arranged in the pipette tip that is coupled to a plunger drive of the pipetting device when the pipette tip is mounted on the attachment.

The liquid is preferably drawn in a single step or in several small steps. The liquid is dispensed in a single step when pipetting, and discharged in several small steps when dispensing.

The metering devices can be designed as practical multichannel pipettes that are driven manually or by electric motor and are held in the hand of the user when metering ("manual pipettes").

In metering stations ("pipetting stations") or metering machines ("pipetting machines"), the metering head can be shifted on a robot arm or another transferring system to shift the metering head above a work surface. Metering stations or metering machines can pick up fresh pipette tips from a holder by the metering head, draw liquids from vessels and discharge them into vessels by the pipette tips, and discard used pipette tips into a waste container. Metering stations or metering machines can be a component of laboratory machines ("workstations") that can perform other procedures with liquids beyond metering liquids. This includes in particular mixing, controlling temperature and other physical procedures, chemical or biochemical conversion, and the analysis of specimens.

The attachments for holding pipette tips are frequently designed as a conical, cylindrical, or partially conical and partially cylindrical projection relative to a housing or another carrier of the metering device. The pipette tips can generally be clamped on to the attachments by a sealing seat at their top end adjacent to a mounting opening. For this, the attachments are pressed into the mounting openings of the pipette tips available in a holder so that the pipette tips expand somewhat and sit securely on the attachments under tension. The force to be applied for clamping increases with the number of pipette tips.

To detach the clamped-on pipette tips from the attachments, the pipetting devices have an ejection apparatus with a drive apparatus and an ejector. By actuating the drive apparatus, the ejector is shifted so that it detaches the pipette tips from the attachments. The drive apparatus is either driven manually or by an electric motor. The ejection force for detaching clamped-on pipette tips from the attachments increases with the number of pipette tips.

Strong force must be applied to clamp pipette tips onto 8, 12, 16, 24, 96 or 384 attachments and to eject the pipette tips from the attachments.

DE 10 2004 003 433 B4 describes a multichannel pipette in which the applied force for clamping the pipette tips onto the attachments and detaching the pipette tips from the attachments is reduced in that the attachments are spring-loaded and project in an axial direction beyond a stop formed by the ejector. If the clamping force exceeds a specific value when clamping on the pipette tips, the attachments yield until the pipette tips lie on the ejector. This limits the clamping force to a value at which the pipette tips are sealingly held on the attachments. The ejection force is also correspondingly limited.

EP 2 735 369 A1 describes a multichannel pipette where the ejection force is further reduced in that the ejector has a plurality of contact elements that sequentially contact the pipette tips in order press them off the attachments.

WO 01/56695 A1 describes a pipetting head with 96 channels, wherein the attachments have a greater conical angle at the bottom end than above in order to reduce the force for mounting pipette tips with a collar having a greater wall thickness at the top end and a lesser wall thickness below the collar. The pipetting head comprises a stop plate for ejecting the pipette tips from the attachments. The stop plate is stepped in order to sequentially press off the pipette tips from the attachments and reduce the ejection force. Posts with pretensioning apparatuses project from the stop plate. A plunger plate that shifts the plungers in cylinders connected to the attachments contacts the pretensioning apparatuses in order to trigger the ejection of the pipette tips from the attachments by the stop plate. The design with pretensioning apparatuses to eject pipette tips is complex.

WO 2005/113149 A1 describes a device for drawing and dispensing liquids with a pipetting head that has 96 attachments for pipette tips. 96 plunger/cylinder units are connected to the attachments and can be manually actuated by a drive mechanism. The pipetting head can be shifted along a vertical guide in order to pick up pipette tips from a pipette tip carrier and suck in and dispense liquid. The pipetting head can be pressed downward with greater force by means of a transmission lever in order to apply the necessary force for picking up 96 pipette tips. The attachments are guided through holes in a perforated plate that is vertically shiftable in order to scrape the pipette tips off the attachments.

DE 20 2008 013 533 U1 describes a pipetting device with a base plate and an elastic sealing plate that covers it laterally on the outside, wherein a plurality of pipetting channels arranged in a given pattern extend through this baseplate and the sealing plate. A magazine equipped with pipette tips in the same pattern that each have a collar lies in a magazine holder to directly connect the base plate in a force fit via the collars and the sealing plate. The magazine holder is formed by a magazine frame that can be raised and lowered by a drive motor via an eccentric gearing in order to bring the pipette tips into sealing contact with the sealing plate, or to detach them from the sealing plate.

Pipetting machines that receive the pipette tips in a magazine in a magazine holder and press them against a sealing plate are marketed by the company Apricot Designs, Inc, Covina, CA, USA, under the product name of "i-Pipette" and "i-Pipette Pro".

The disadvantage is that these pipetting machines can only work with special pipette tips in a special magazine. It is furthermore disadvantageous that the magazine holder is filled manually.

EP 0 737 726 A2 describes a device for simultaneously picking up a plurality of pipette tips by means of parallel attachments in a straight row that each have an elastomer O-ring in an annular groove with an adjustable groove width. The extension of the O-rings in the peripheral direction can be changed by adjusting the groove widths in order to sealingly clamp tight the pipette tips on the attachments and detach the pipette tips from the attachments. In order to adjust the groove widths, the grooves are each bordered by a threaded sleeve that is screwed onto the attachment and can be turned on the attachment by means of a coupled drive mechanism. Each threaded sleeve is securely connected to a toothed wheel. The toothed wheels mesh with a single rack that is driven by a rotatable handgrip. In an alternative embodiment, each individual threaded sleeve is individually driven by an electric motor, and the electric motors are connected to a common power supply for synchronous operation. Below the attachments, there is a guide plate with a row of notches for aligning the pipette tips on the attachments when lowering the device. The drive for securely clamping the pipette tips to the attachments has a complicated design. The notches do not prevent the pipette tips from tilting on the attachments.

Accordingly, the device is only suitable for simultaneously picking up a small number of pipette tips that are not arranged too close to one another. The exemplary embodiment has four attachments for simultaneously picking up four pipette tips.

DE 199 17 375 C2 describes a pipetting unit with a pipette tip and an attachment that has a pipette tube with a coupling sleeve at the bottom end, an O-ring that is shoved onto the pipette tube and consists of an elastically deformable material, and a sleeve shoved onto the pipette tube. The sleeve serves to axially compress the O-ring so that it is deformed radially and engages sealingly in an annular groove in the inner perimeter of the pipette tip. The O-ring can be relieved to detach the pipette tip. To hold the pipette tip on the attachment in a predetermined position, the attachment and pipette tip have interacting axial positioning means. Since the O-ring engages in an annular groove in the pipette tip, the axial positioning means that adjoin each other are pretensioned. To eject of the pipette tip, a movable ejector is provided that is formed as the ejector tube surrounding the sleeve. The ejector is actuatable hydraulically or by an electric motor, or by means of a preloaded spring that is tensioned while mounting the pipette tip on the pipetting unit. The actuating means for securely clamping and detaching the pipette tip on the attachment are complex and have a large space requirement. Affixing the pipette tips in the specific coupling position can be easily prevented by production tolerances or imprecisely positioning the pipette tips on the attachment. The annular groove and the axial positioning means restrict the use of various pipette tips.

Against this backdrop, the object of the invention is to provide a metering head with a large number of attachments, in particular 8, 12, 16, 24, 96 or 384 attachments, for simultaneously picking up a large number of pipette tips that allows reliable automated picking up and detachment of variously designed pipette tips with reduced design complexity.

The metering head according to the invention for a metering device comprises:
  a carrier on which a plurality of parallel attachments for picking up pipette tips are arranged adjacent to each other,
  wherein each attachment has the following features:
    a tube which has an at least partially peripheral supporting protrusion that protrudes outward at the bottom end from the outer perimeter,
    at least one sleeve which surrounds the tube and can be axially shifted on the tube, and
    at least one elastomer O-ring which surrounds the tube and is arranged adjacent to the bottom end of the sleeve,
  a pressure plate which is arranged above the sleeves and which has a plurality of first holes through which the tubes extend, wherein the pressure plate can be shifted along the tubes between a release position at a first distance from the supporting protrusions and a clamping position at a second distance from the supporting protrusions that is smaller than the first distance, the pressure plate presses against the upper edge of the adjacent sleeves of all attachments in the clamping position in such a way that the sleeves are pressed, at the bottom ends, against the adjacent O-rings, and the O-rings are expanded in order to securely clamp pipette tips shoved onto the attachments;
  a first shifting apparatus, which is connected to the pressure plate and is designed to shift the pressure plate between the release position and the clamping position.

With the metering head according to the invention, the movement of the first shifting apparatus is transmitted by the pressure plate simultaneously to all the sleeves. The shifting of the pressure plate from the release position into the clamping position can accordingly expand all the O-rings and thereby secure on the attachments the pipette tips shoved onto the attachments. Conversely, by shifting the pressure plate from the clamping position into the release position, all of the O-rings can be relaxed, and the clamping of the pipette tips can be detached thereby. Simultaneously securely clamping and releasing a large number of pipette tips is enabled by simultaneously pressing the pressure plate against all the sleeves, and by simultaneously releasing all the sleeves. The invention is suitable in particular for metering heads with 8, 12, 16, 24, 96 or 384 attachments. The transmission of force from the first adjusting device via the pressure plate to the sleeves promotes a comparatively simple, compact and light construction. Consequently, the design complexity of a metering device equipped with the metering head can also be reduced. Clamping securely by expanding the O-rings promotes the use of pipette tips with different shapes and dimensions. The invention comprises embodiments in which each attachment only has a single O-ring and only a single sleeve.

Furthermore, the invention comprises embodiments in which each attachment has a plurality of o rings and a plurality of sleeves. In one preferred embodiment of the invention, the O-ring adjoins the supporting protrusion at the bottom.

According to a preferred embodiment, the metering head for the metering device comprises:
- a carrier on which a plurality of parallel attachments for picking up pipette tips are arranged adjacent to each other,
- wherein each attachment has the following features:
  - a tube which has a supporting protrusion at the bottom end that protrudes outward and extends peripherally at least partially,
  - at least one sleeve with a peripheral tapering at the bottom end which surrounds the tube and can be axially shifted on the tube, and
  - at least one elastomer O-ring which surrounds the tube and is arranged adjacent to the tapering,
- a pressure plate which is arranged above the sleeves and which has a plurality of first holes through which the tubes extend, wherein the pressure plate can be shifted along the tubes between a release position at a first distance from the supporting protrusions and a clamping position at a second distance from the supporting protrusions that is smaller than the first distance, the pressure plate presses against the upper edge of the adjacent sleeves of all attachments in the clamping position in such a way that the sleeves are pressed into the adjacent O-rings, and the O-rings are expanded in order to securely clamp pipette tips shoved onto the attachments;
- a first shifting apparatus which is connected to the pressure plate and is designed to shift the pressure plate between the release position and the clamping position.

The metering head according to the invention for a metering device comprises:
- a carrier on which a plurality of parallel attachments for picking up pipette tips are arranged adjacent to each other,
- wherein each attachment has the following features:
  - a tube which has an at least partially peripheral supporting protrusion that projects at the bottom end from the outer perimeter,
  - a first sleeve which surrounds the tube and can be axially shifted on the tube, and
  - an elastomer first O-ring which surrounds the tube and is arranged adjacent to the bottom end of the first sleeve,
  - a second sleeve which surrounds the tube above the first sleeve and can be axially shifted on the tube, and
  - an elastomer second O-ring which surrounds the tube, is arranged adjacent to the second end of the second sleeve, and adjoins the first sleeve at the bottom,
  - the first and second sleeves can be shifted between a release position at a first distance from the supporting projections and a clamping position at a second distance from the supporting projections that is smaller than the first distance, in the clamping position, the bottom end of the second sleeves are pressed into the adjacent second O-rings, and the bottom ends of the first sleeves are pressed into the adjacent first O-rings, and the first and second O-rings are expanded in order to securely clamp the pipette tips shoved onto the attachments,
- A second shifting apparatus that is coupled to the first and second sleeves of all the attachments, and is designed to shift the first and second sleeves between the release position and clamping position.

With the metering head according to the invention, each attachment has a first O-ring and a second O-ring that can be expanded by pressing on a first sleeve and a second sleeve and can thereby be securely clamped in a pipette tip. Conversely, the clamping of the first O-ring and the second O-ring in the pipette tip can be detached. Since each pipette tip is securely clamped to an attachment by means of two rings, a precise alignment of a large number of pipette tips is enabled. The invention is suitable in particular for metering heads with 8, 12, 16, 24, 96 or 384 attachments, wherein the pipette tips must be aligned as parallel as possible so that they can be simultaneously introduced into a corresponding number of different seats. Moreover, the force required for securely clamping is reduced by using two O-rings. This promotes a comparatively simple, compact and light design. Consequently, the design complexity of a metering device equipped with the metering head can also be reduced. Furthermore, fixation by means of two O-rings promotes the use of pipette tips with different shapes and dimensions. According to one preferred embodiment of the invention, the O-ring adjoins the supporting protrusion at the bottom.

According to a preferred embodiment, the metering head for the metering device comprises:
- a carrier on which a plurality of parallel attachments for picking up pipette tips are arranged adjacent to each other,
- wherein each attachment has the following features:
  - a tube which has an at least partially peripheral supporting protrusion that projects at the bottom end from the outer perimeter,
  - A first sleeve with a peripheral first tapering at the bottom end which surrounds the tube and can be axially shifted on the tube, and
  - an elastomer first O-ring which surrounds the tube and is arranged adjacent to the first tapering;
  - A second sleeve with a peripheral second tapering at the bottom end which surrounds the tube above the first sleeve and can be axially shifted on the tube, and
  - an elastomer second O-ring which surrounds the tube, is arranged adjacent to the second tapering, and adjoins the first sleeve at the bottom, and
  - the first and second sleeves can be shifted between a release position at a first distance from the supporting projections and a clamping position at a second distance from the supporting projections that is smaller than the first distance, in the clamping position, the second taperings of the second sleeves are pressed into the adjacent second O-rings, and the first taperings of the first sleeves are pressed into the adjacent first O-rings, and the first and second O-rings are expanded in order to securely clamp the pipette tips shoved onto the attachments, A second shifting apparatus that is coupled to the first and second sleeves of all the attachments, and is designed to shift the first and second sleeves between the release position and clamping position.

According to a preferred embodiment of the invention, the pressure plate and the first adjusting device is the second adjusting device comprising:

a carrier on which a plurality of parallel attachments for picking up pipette tips are arranged adjacent to each other.

Each attachment of the metering head has the following features:

a tube which has an at least partially peripheral supporting protrusion that projects at the bottom end from the outer perimeter, a first sleeve which surrounds the tube and can be axially shifted on the tube, and an elastomer first O-ring which surrounds the tube and is arranged adjacent to the bottom end of the first sleeve, a second sleeve which surrounds the tube above the first sleeve and can be axially shifted on the tube, and an elastomer second O-ring which surrounds the tube, is arranged adjacent to the bottom end of the second sleeve, and adjoins the first sleeve at the bottom, and the first and second sleeves can be shifted between a release position at a first distance from the supporting projections and a clamping position at a second distance from the supporting projections that is smaller than the first distance, in the clamping position, the bottom end of the second sleeves are pressed onto the adjacent second O-rings, and the bottom ends of the first sleeves are pressed onto the adjacent first O-rings, and the first and second O-rings are expanded in order to securely clamp the pipette tips shoved onto the attachments.

Moreover in this embodiment, the pressure plate is arranged above the second sleeves and, in the clamping position, presses against the top edge of the adjacent second sleeves of the different attachments in such a way that the bottom ends of the second sleeves are pressed onto the adjacent second O-rings, and the second O-rings are expanded, the second O-rings are pressed against the top edge of the first sleeves in such a way that the bottom ends of the first sleeves are pressed against the adjacent first O-rings, and the first O-rings are expanded in order to securely clamp pipette tips shoved onto the attachments.

Furthermore, embodiments are comprised by the invention, wherein the first sleeve and the second sleeve are adjustable by means of other shifting apparatuses between the release position and the clamping position. In particular, embodiments in which each second sleeve is screwed onto an adjustment thread of the attachment and can be rotated by means of a coupled gear mechanism, for example as described in EP 0 737 726 A2.

According to a preferred embodiment, attachments are designed as a conical, cylindrical, or partially conical and partially cylindrical projection relative to the housing or another carrier. Preferably, the attachments are securely connected to the carrier of the metering head.

O-rings have a circular shape in a longitudinal section (vertical section) according to a preferred embodiment so that they have the overall geometric shape of a torus. However, the invention also comprises embodiments in which the longitudinal section of the O-rings has a polygonal, elliptical, or other shape.

According to a preferred embodiment, the elastomer O-rings consist of rubber, silicone or thermoplastic elastomer.

Sleeves can both be long, hollow-cylindrical bodies, wherein the length exceeds the inner diameter, as well as short hollow cylindrical bodies, wherein the length is less than the inner diameter. In particular, ring-shaped bodies are sleeves. The ring-shaped bodies can have different cross-sectional shapes. In particular, the ring-shaped bodies can have a polygonal, elliptical or circular shape in a longitudinal section. When the ring-shaped bodies have a circular shape in a longitudinal section, they have the overall geometrical shape of a torus.

A carrier is in particular a housing and/or a frame (chassis), or other single or multipart bearing structures.

The first shifting apparatus is designed such that it is able to shift the pressure plate from the release position into the clamping position, and to shift the pressure plate from the clamping position into the release position. With the metering head when the pressure plate is arranged in the release position, the sleeves are also arranged in a release position, and when the pressure plate is arranged in the clamping position, the sleeves are also arranged in a clamping position. In some embodiments in which the sleeves are shifted from the clamping position into the release position in that the pressure plate relieves the sleeves so that they are shifted out of the clamping position into the release position due to the resetting forces of the O-rings. Furthermore, in some embodiments in which the pressure plate actively shifts the sleeves from the clamping position into the release position, for example in that it is securely connected to the sleeves.

The second shifting apparatus is designed such that it is able to shift the first and second sleeves plate from the release position into the clamping position, and to shift the first and second sleeves from the clamping position into the release position. In some embodiments in which the first and second sleeves are shifted from the clamping position into the release position in that the shifting apparatus relieves the first and second sleeves so that they are shifted out of the clamping position into the release position due to the resetting forces of the O-rings. In this case, the second shifting apparatus is for example formed by the pressure plate and the shifting apparatus in some embodiments in which the second shifting apparatus actively shifts the first and second sleeves out of the clamping position into the release position.

According to one embodiment of the metering head the sleeves at the bottom end have a peripheral tapering. According to an embodiment of the metering head the first sleeves have a peripheral first tapering at the bottom end, and/or the second sleeves have a peripheral second tapering at the bottom end. While being shifted from the release position into the clamping position the (first and/or second) sleeves with their (first and/or second) taperings are pressed into the adjacent (first and/or second) O-rings, whereby the (first and/or second) O-rings are expanded very strongly, and the pipette tips shoved onto the attachments are clamped very securely. The clamping effect is stronger than when the (first and/or second) O-rings are merely expanded radially from pressing on flat bottom ends of (first and/or second) sleeves in a vertical direction. (First and/or second) taperings within the meaning of the invention are generally the surfaces of revolution that taper toward the bottom end of the sleeve. According to preferred embodiments, the taperings preferably have at least one of the following geometries: Frusticonical surface ("chamfer") or cone zone. Combinations of the aforementioned geometries are also taperings within the meaning of the invention.

The metering head is preferably designed so that the forces arising to expand the O-rings remain in the metering head and do not stress the metering device to be connected to the metering head. To accomplish this, the first shifting apparatus or the second shifting apparatus adjoins the carrier according to a preferred embodiment. To accomplish this, for example the first or second shifting apparatus is held or secured to the carrier. Since the first or second shifting apparatus adjoins the carrier, the reaction forces that act on the shifting apparatus are deflected when shifting the sleeves in the carrier. The reaction forces acting on the O-rings when pressing in the sleeves are deflected by the supporting projections, and the attachments are also deflected into the carrier. Consequently, the forces arising during the expansion of the O-rings remain within the metering head.

According to a preferred embodiment, the inner diameter of the first O-ring is less than the inner diameter of the second O-ring, and the outer diameter of the first O-ring is less than the outer diameter of the second O-ring. The statements refer to the undeformed state of the first O-ring and the second O-ring. This embodiment enhances a secure clamping of the pipette tips with an expansion at the top end on the attachments. The expansion facilitates the introduction of the attachments into the pipette tips.

According to another embodiment, the first O-ring is guided on the inner perimeter on the tube, and the second O-ring is guided on the inner perimeter on an end of the second sleeve engaging therein. This advantageously centers the first O-ring and the second O-ring on the attachment.

According to a preferred embodiment, the supporting projection is a support ring surrounding the bottom end of the tube. The support ring can advantageously be combined with the tube during production. According to another embodiment, the support ring tapers towards its bottom end. This facilitates the introduction of the attachment into the mounting opening of a pipette tip.

According to a preferred embodiment, the pressure plate is arranged below the carrier. The pressure plate can then lie directly on the peripheral top edges of the sleeve. The pressure plate can, however, also be arranged above the carrier and lie on the extensions of the sleeves that penetrate the passages in the carrier.

According to a preferred embodiment, the first shifting apparatus has at least one guide shaft that is connected at the bottom to the pressure plate and is coupled at the top by an eccentric gearing to an electric motor. This makes possible a structurally very simple and precise first shifting apparatus.

According to another embodiment, four guide shafts are securely connected at the bottom end to the pressure plate, and are coupled at the top end by at least one eccentric gearing to at least one electric motor. This yields precise parallel guidance of the pressure plate with minimal design complexity.

According to another embodiment, each guide shaft is mounted in a recirculating ball bearing that is held in the carrier. This yields a particularly low-friction and precise first shifting apparatus.

According to another embodiment, each guide shaft has a gate that extends at the top end perpendicular to the guide shaft, an eccentric that is on a first shaft oriented perpendicular to the guide shaft and the gate and engages in the gate, and the first shaft is coupled to an electric motor. This converts the rotational movement of an electric motor into the axial movement of at least one guide shaft in a particularly simple and low-friction manner.

According to a preferred embodiment, each eccentric there is a ball bearing that is guided in a gate. This yields a particularly low friction transmission of force from the eccentric to the guide shafts.

According to a preferred embodiment, a single electric motor is coupled by a first gearing to all the first shafts. This yields a particularly simple, space-saving and weight-saving design. Synchronization of a plurality of electric motors so that the guide shafts run parallel is unnecessary. According to one preferred embodiment, the first gearing is a worm gear.

According to one preferred embodiment, a plurality of first shafts are arranged parallel to each other and are connected to a first worm wheel so as to rotate conjointly, the first worm wheels are flush with each other, a second shaft is arranged in the same plane as the first worm wheels, the second shaft is connected to the first screw so as to rotate conjointly, wherein the first screw meshes with a first worm wheel, and a second shaft is coupled to the electric motor. This enables a space-saving and weight saving construction. According to another embodiment, the second shaft is connected to a second worm wheel so as to rotate conjointly, and the motor shaft of the electric motor is connected to a second screw so as to rotate conjointly and meshes with the second worm wheel. This promotes a space-saving and weight saving construction.

According to another embodiment, the at least one electric motor is coupled to an electric control apparatus that controls the electric motor such that the pressure plate can be shifted between the release position and the clamping position.

According to another embodiment, the at least one electric motor is coupled to a rotary encoder that is connected to the electric control apparatus which is designed to determine the position of the pressure plate depending on the rotational position of the motor shaft of the electric motor detected by means of the rotary encoder. This embodiment guarantees particularly precise shifting of the pressure plate between the release position and the clamping position.

According to another preferred embodiment, a stop plate is arranged below the pressure plate and has a plurality of second holes through which the attachments extend in order to shove pipette tips on the attachments until contact with the stop plate. By means of the stop plate, all of the pipette tips are shoved simultaneously onto the attachments at a given position. To accomplish this, the metering head with the attachments can be inserted into a provided group of pipette tips until the stop plate sits on the top edge of the pipette tips. According to another embodiment, the stop plate is securely held on the carrier.

According to a preferred embodiment, a third shifting apparatus is connected to the stop plate and is designed to shift the stop plate between a stop position at a first distance from the supporting projections and an ejection position at a second distance from the supporting projections that is smaller than the first distance in order to shove pipette tips on the attachments in the stop position until contacting the stop plate, and to eject them from the attachments by shifting the stop plate from the stop position to the ejection position. This ensures the ejection of the pipette tips from the attachments even when the O-rings still lie against the insides of the pipette tips and securely hold them after being relieved by the sleeves. The stop plate is an ejection plate. In particular, the pipette tips can adhere to the rings after relieving the sleeves ("stick tight") so that they do not readily fall down.

According to another embodiment, the third shifting apparatus comprises rocker arms that are pivotably mounted on the carrier, transmission shafts that are securely connected to the pressure plate and project upward therefrom, each lying against one end of a rocker arm, and ejection shafts which are securely connected to the stop plate and each lie against another end of the rocker arm so that when the pressure plate is lifted, the transmission shafts pivot the rocker arm, and they press the stop plate via the ejection shafts out of the stop position into the ejection position. In this embodiment, the movement of the pressure plate is advantageously used to relieve the O-rings in order to shift the stop plate into the ejection position. This reduces the complexity of the third shifting apparatus. Moreover, the forces arising during the ejection of the pipette tips are captured by the metering head.

According to another embodiment, a spring apparatus is between the stop plate and the carrier that moves the stop plate back into the stop position when the pressure plate is shifted from the release position into the clamping position. This is particularly advantageous in embodiments of the third shifting apparatus with rocker arms because these are not pivoted back when the pressure plate is lowered by the transmission shafts. According to a preferred embodiment, the carrier has at least one stop apparatus against which the stop plate lies in stop position so that it cannot be further shifted toward the carrier. In a simple embodiment, the stop apparatus is formed by at least three stop elements that project downward from the bottom side of the carrier such that the top side of the stop plate comes into contact with the stop elements in the stop position.

According to another embodiment, a spacing ring is seated on each tube next to the pressure plate and presses the pressure plate via the spacing ring against the top end of the adjacent sleeve. This promotes a compact design since the pressure plate can be shifted close to the stoplight.

According to another embodiment, the sleeves have a flat face at the top against which the pressure plate, or the second O-ring, or the spacing ring lies. This yields an advantageous transmission of force between the sleeves and the O-rings.

One embodiment comprises:
a carrier on which a plurality of parallel attachments for picking up pipette tips are arranged adjacent to each other,
wherein each attachment has the following features:
a tube which has an at least partially peripheral supporting protrusion that protrudes outward at the bottom end from the outer perimeter,
at least one sleeve which surrounds the tube and can be axially shifted on the tube, and
at least one elastomer O-ring which surrounds the tube and is arranged adjacent to the bottom end of the sleeve,
a pressure plate which is arranged above the sleeves and which has a plurality of first holes through which the tubes extend, wherein the pressure plate can be shifted along the tubes between a release position at a first distance from the supporting protrusions and a clamping position at a second distance from the supporting protrusions that is smaller than the first distance, the pressure plate presses against the upper edge of the adjacent sleeves of all attachments in the clamping position in such a way that the sleeves are pressed, at the bottom ends, against the adjacent O-rings, and the O-rings are expanded in order to securely clamp pipette tips shoved onto the attachments;
a first shifting apparatus, which is connected to the pressure plate and is designed to shift the pressure plate between the release position and the clamping position,
wherein the first shifting apparatus has the following features:
a stop plate is arranged below the pressure plate and has a plurality of second holes through which the attachments extend, wherein the stop plate can be shifted between a stop position at a first distance from the supporting projections, and an ejection position at a second distance from the supporting projections that is less than the first distance, and
a second gearing that is coupled to the stop plate and the pressure plate, wherein the second gearing is designed to shift the pressure plate from the release position into the clamping position when the stop plate is shifted from the ejection position into the stop position,
a latching apparatus that has at least one first latching element connected to the stop plate, and at least one second latching element connected to the carrier, wherein the first and second latching elements are designed to latch with each other when the pressure plate is arranged in the clamping position, and
an unlatching apparatus that has at least one unlatching element and an ejector element connected to the unlatching element, wherein the unlatching apparatus is designed to disconnect the latching connection between the first latching element and the second latching element when the ejector element is shifted from a starting position into an unlatched position.

When mounting the pipette tips on the attachment, the pipette tips contact the stop plate by their top edge and shift it upward. At the same time, the pressure plate arranged above the stop plate is moved downward. In so doing, the pressure plate shifts the sleeves downward which expands the O-rings on the attachment, and the pipette tips are clamped securely to the attachments. In the clamped position, the pressure plate is latched such that the pipette tips are fixed to the metering head. To detach the pipette tips, the latching apparatus is unlatched by means of the unlatching apparatus. To do this, the ejector element is actuated so that the unlatching element releases the latching between the first and second latching element. After unlatching the latching apparatus, the sleeves and the pressure plate can return to the release position due to the effect of the elastic O-rings. The O-rings contract, and the clamping between the pipette tips and the attachments is released so that they can drop from the attachments. In this embodiment, forces that arise when mounting the pipette tips on the attachments are used to securely clamp the pipette tips to the attachments. The first shifting apparatus is formed by the stop plate and the second gearing. It can be designed in a very simple and space-saving manner. The stop plate can additionally be used to shove the pipette tips into a given position on the attachments, and to scrape the pipette tips off the attachments. Preferably, the metering head is intended for use with a manual pipette.

According to another embodiment, the second gearing is a lever gearing that comprises two angle levers that are pivotably mounted on the carrier, that lie with the ends of a first lever arm at a distance from each other on the top side of the pressure plate, and that are coupled with the ends of a second lever arm at a distance from each other to the stop plate. When the stop plate is shifted upward from the top edges of the pipette tips, it pivots the second lever arms upward. This pivots the first lever arms downward and shifts the pressure plate downward, whereby the pipette tips are securely clamped to the attachments. After unlatching the latching apparatus, the stop plate can be shifted under its own weight back to the ejection position and detach the pipette tips from the attachments. The second gearing can be designed in a very simple and space-saving manner.

According to another embodiment, the first latching element is a rack that projects vertically upward from the stop plate, and the second latching element is a pawl that is pivotably mounted on the carrier and pretensioned by a spring apparatus toward the rack, and latches into the rack upon shifting the stop plate upward. This latching apparatus can be designed in a very simple and space-saving manner. One preferred embodiment has precisely two racks and precisely two pawls. According to another embodiment, the racks project upward from the ends of the stop plate. According to another embodiment, the racks have the teeth on the edges that face each other.

According to another embodiment, the unlatching apparatus comprises at least one wedge gear that has a first wedge element on the pawl sharply angled to the vertical, and/or a second wedge element on the ejector element sharply angled to the vertical, the ejector element is shiftably guided on the carrier in a vertical direction on guide apparatuses such that, by shifting the ejector element in a vertical direction, the ejector element and the pawl can be brought into engagement with each other by at least one of the first and second wedge elements, whereby the pawl can be lifted out of the teeth of the rack.

According to another embodiment, a first ejector part comprises the stop plate and two racks that project upward from the stop plate, a second ejector part in the form of a crossmember comprises two ejector elements that project vertically downward from the crossmember and an actuating element that projects vertically upward, and the first ejector part and the second ejector part have first and second stop elements which contact each other after the unlatching of the first and second latching elements, whereby the second ejector part entrains the first ejector part upon being further shifted downward. In this embodiment, first the unlatching apparatus unlatches by the downward shifting of the second ejector part, and then the stop plate is entrained downward in order to scrape the pipette tips off the attachments. According to another embodiment, the ejector elements are ejector rods. According to another embodiment, the ejector elements have first wedge elements on their bottom ends.

According to another embodiment, the metering head has 8, 12, 16 or 24 has attachments.

According to another embodiment, pipette tips are arranged on the attachments of the metering head and are securely clamped by the expansion of the O-rings. The pipette tips are each tubes with a tip opening at the bottom end and a mounting opening at the upper end. The inner diameter and the outer diameter of the pipette tips generally expand from the tip opening to the mounting opening. According to a preferred embodiment, the top edges of the pipette tips lie against the bottom side of the stop plate.

According to a preferred embodiment, the metering head comprises at least one displacement apparatus that is communicatingly connected to the connecting holes of the attachments. For this, channels extend from a cylinder or another displacement chamber of the displacement apparatus through the attachments up to the connecting holes in the attachments. According to a preferred embodiment, the metering head comprises a plurality of displacement apparatuses, wherein the displacement chamber of each displacement apparatus is communicatingly connected to the connecting hole of a single attachment. According to a preferred embodiment, each displacement apparatus is a cylinder with a plunger which can move therein. Alternatively, each displacement apparatus is a displacement chamber of at least one deformable wall.

Furthermore, the object of the invention is to provide a metering device with a large number of attachments, in particular 8, 12, 16, 24, 96 or 384 attachments, for simultaneously picking up a large number of pipette tips that allows reliable automated picking up and detachment of variously designed pipette tips with reduced design complexity.

In one embodiment, the metering device comprises a metering head for metering liquids of the above-described type.

Given the comparatively small size, the low weight of the metering head according to the invention and the reduced applied force for securely clamping pipette tips and detaching pipette tips from the metering head, the design complexity can be reduced for the metering device. The metering device can be designed for very small loads if the metering head is designed such that the forces that arise remain in the metering head upon expanding the O-rings.

According to another embodiment, the metering device is a metering station, a metering machine or laboratory machine. According to a preferred embodiment, the metering station, the metering machine or laboratory machine is equipped with a metering head with 96 attachments for 96 pipette tips, or with a metering head with 384 attachments for 384 pipette tips.

According to another embodiment, the metering device is a manageable multichannel pipette that is driven manually or by an electric motor and can be held manually by the user when metering. The multichannel pipette preferably has eight or 12 attachments for eight or 12 pipette tips, or a whole number multiple of eight or 12 attachments for a corresponding number of pipette tips.

According to a preferred embodiment, the metering station, the metering machine or the laboratory machine comprises at least one of the following apparatuses:
- at least one holder with a plurality of pipette tips held therein,
- at least one specimen vessel for providing liquid specimens,
- at least one reagent vessel for providing reagents,
- at least one waste container for picking up used pipette tips.

According to a preferred embodiment of the metering station, the metering machine or the laboratory machine, the metering head is held on a three-axis transfer unit that is designed to shift the metering head along three axes in space.

Furthermore, the object of the invention is to create a method for metering liquids with a metering head, in which a large number of pipette tips, in particular 8, 12, 16, 24, 96 or 384 pipette tips, in particular differently designed pipette tips, can be simultaneously, reliably and automatically picked up and detached with reduced design complexity.

In the method according to the invention for metering liquids, the liquids are metered by means of a metering head of the above-described type.

According to a preferred embodiment of the method:
- a group of pipette tips are provided in a holder for pipette tips,
- the sleeves are shifted into the release position, the metering head with the attachments is introduced into the mounting openings of the provided pipette tips so that the O-rings dip into the provided pipette tips, the sleeves are brought into the clamping position, and the pipette tips are thereby clamped securely on the attachments, the metering head is lifted, and the pipette tips securely clamped thereto are removed from the holder, meterings are carried out with the pipette tips clamped securely to the attachments of the metering head, the pipette tips are released from the attachments by shifting the sleeves from the clamping position into the release position.

According to a preferred embodiment, a metering station, a metering machine or a laboratory machine is equipped with the metering head, and the shifts of the metering head are carried out by a three-axis transfer unit of the metering machine or laboratory machine.

According to another embodiment, the metering head is coupled to an electrical control apparatus of the metering machine or laboratory machine, and the shifts of the first or second shifting apparatus of the metering head is controlled by the electronic control apparatus.

According to another embodiment, the stop plate is brought into the stop position before dipping the attachments into the pipette tips, and the attachments are dipped into the pipette tips until the top ends of the pipette tips lie against the stop plate, then the pipette tips are securely clamped to the attachments by shifting the sleeves from the release position into the clamping position, and after the meterings are carried out, the pipette tips are detached from the attachments by shifting the sleeves from the clamping position into the release position, and by shifting the stop plate from the stop position into the ejection position.

According to another embodiment, liquid is drawn from vessels and dispensed into vessels using the pipette tips on the metering head.

According to another embodiment, the metering head is shifted to be above a waste container before ejecting the pipette tips from the attachments, and the pipette tips are ejected into the waste container.

BRIEF DESCRIPTION OF THE SEVERAL VIEWS OF THE DRAWING

The invention is explained below based on the accompanying drawings of an exemplary embodiment. In the drawings.

DETAILED DESCRIPTION OF THE INVENTION

In this application, the terms "top" and "bottom", "horizontal" and "vertical" refer to an orientation of the metering head with the attachments in a vertical direction, wherein the attachments are arranged at the bottom and the other parts of the metering head are arranged above.

In the description of different embodiments, the same reference numbers are used for components with the same names.

Figure 1:
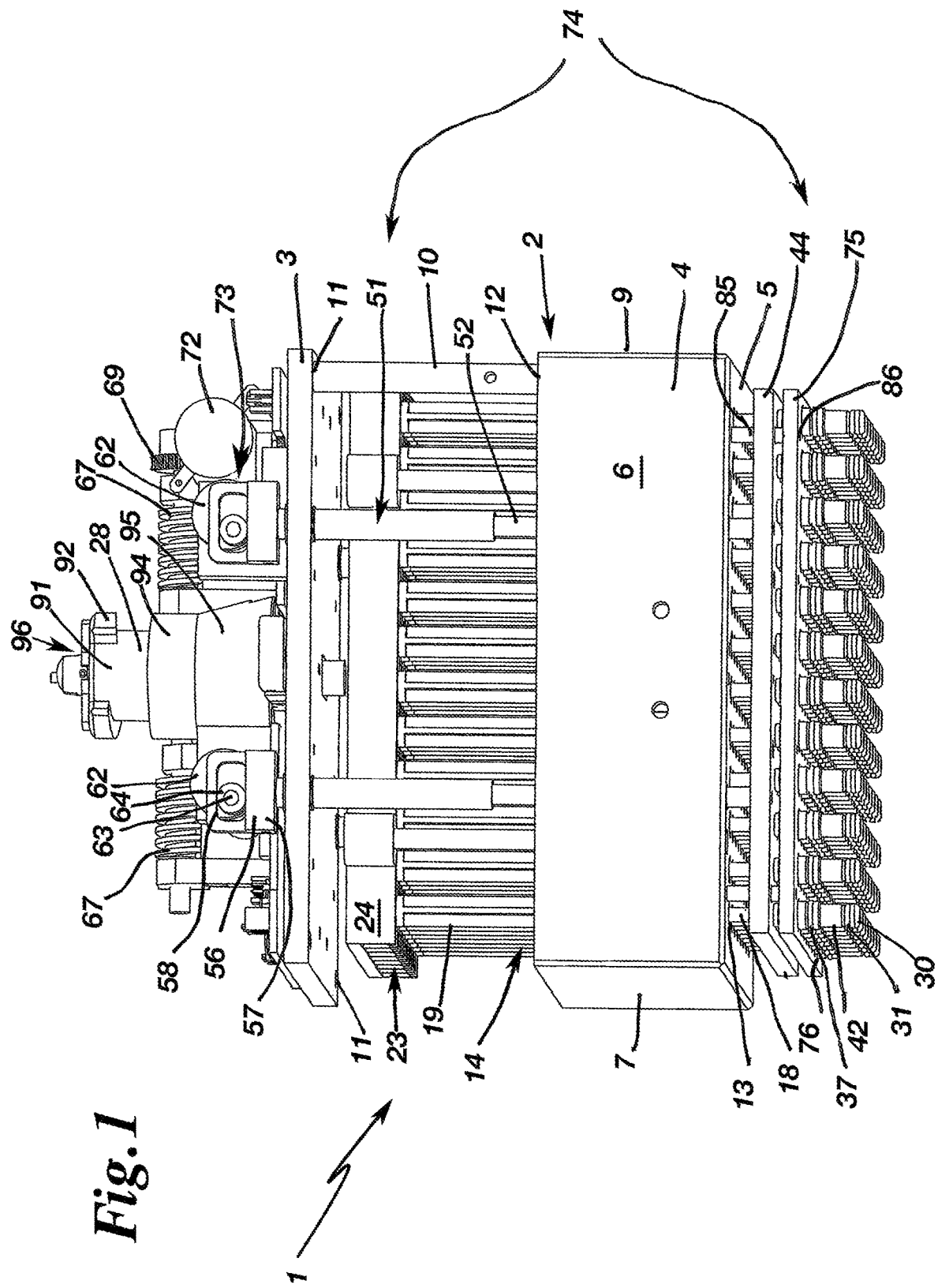
FIG. 1 shows a metering head in a perspective view diagonally from the front and from the side.
Figure 2:
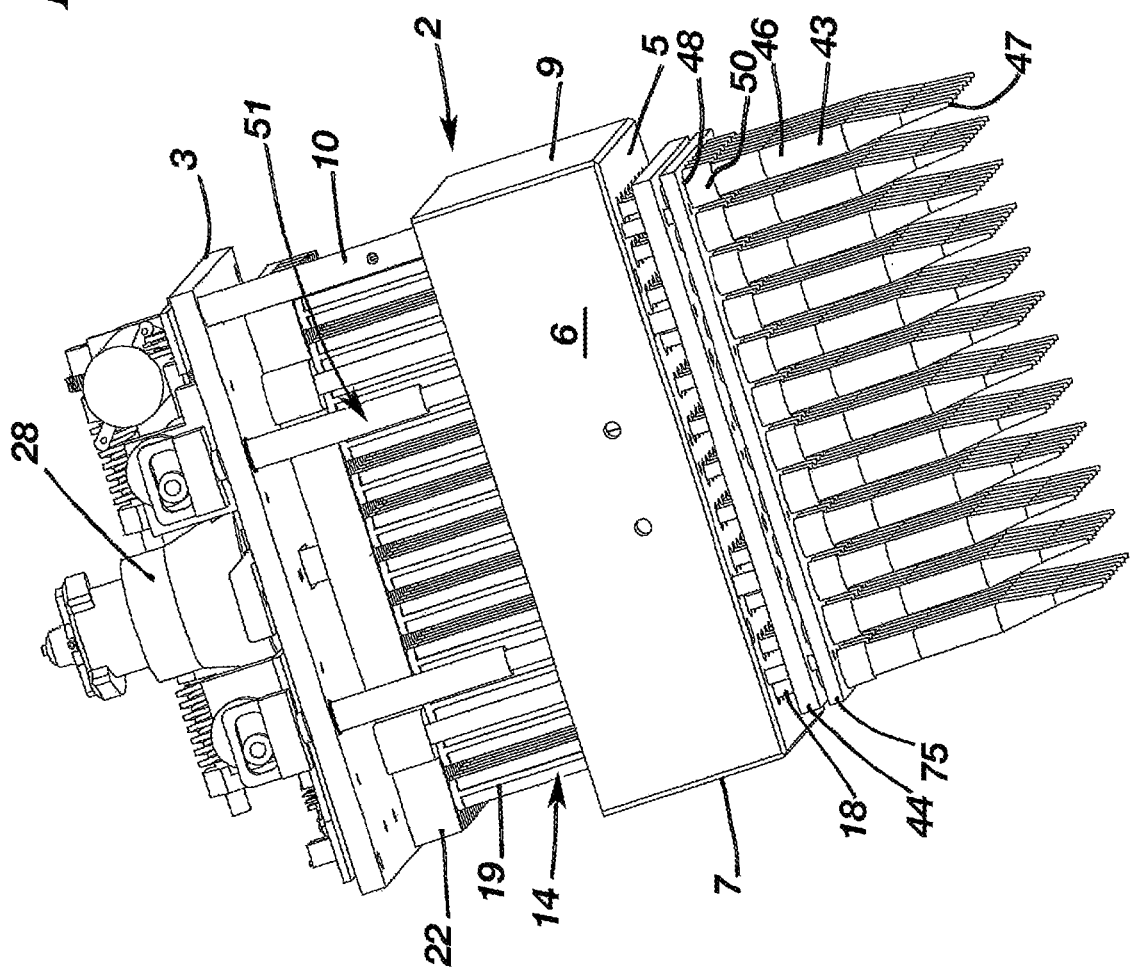
FIG. 2 shows the metering head with pipette tips in a perspective view diagonally from the front and from the other side.
Figure 3:
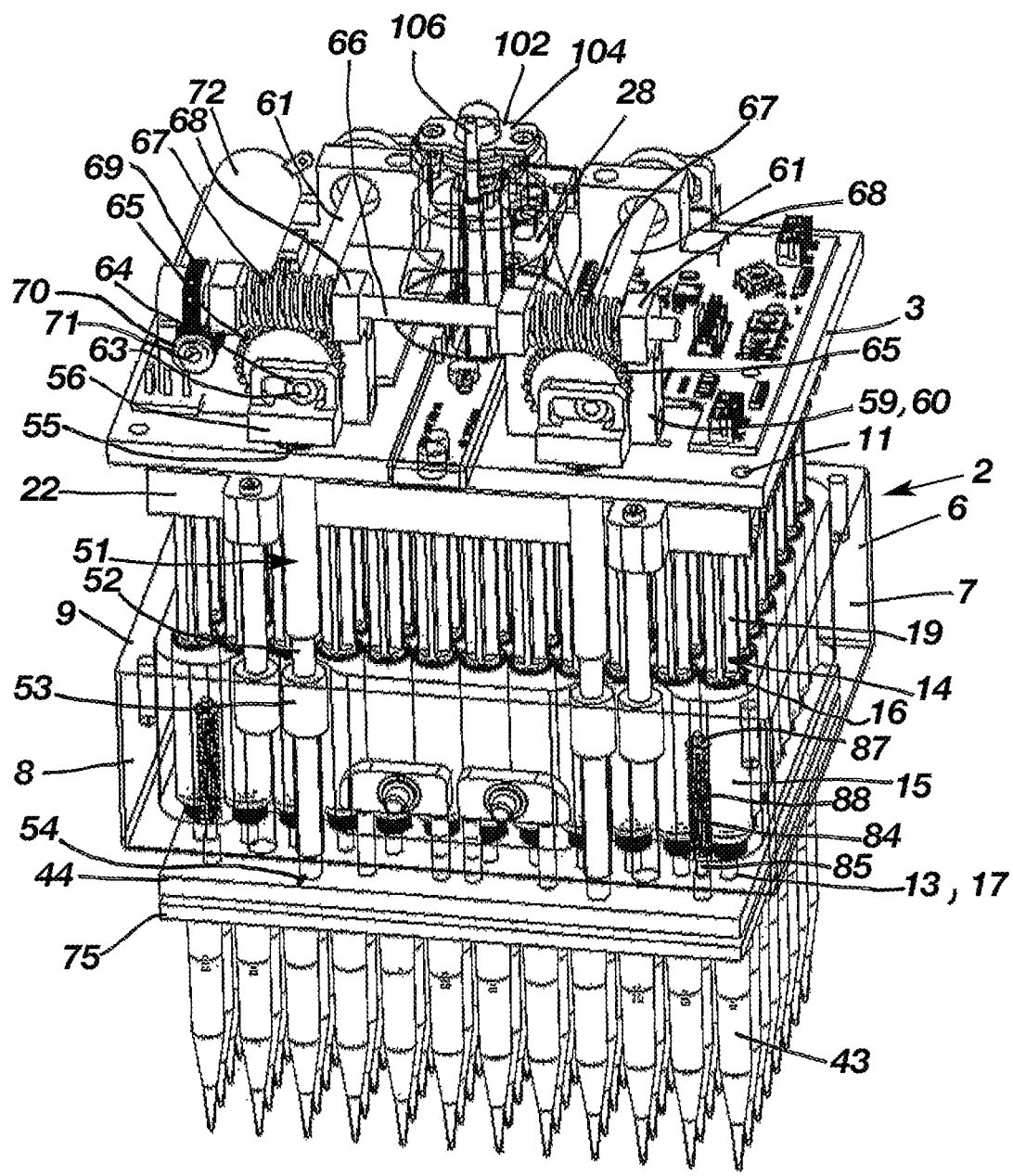
FIG. 3 shows the metering head with pipette tips in a perspective view diagonally from the rear and from the side.

According to FIGS. 1 to 3, a metering head 1 comprises a multipart carrier 2 that has a rectangular carrier plate 3, and underneath a box-shaped carrier housing 4 that is open at the top. The carrier housing 4 has a bottom wall 5 and side walls 6, 7, 8, 9 that project upward from the edges of the bottom wall 5. The carrier plate 3 is oriented parallel relative to the bottom wall 5. The carrier plate 3 is secured by studs 10 at a distance from the top edge of the carrier housing 4. The ends of the studs 10 are screwed into first and second threaded holes 11, 12 at the four corners of the carrier plate 3 and the top edge of the carrier housing 4. For reasons of simplification, only one stud 10 is shown.

A total of 96 third threaded holes 13 are formed in the bottom wall 5 in a pattern arrangement with eight rows and twelve columns. The metering head comprises 96 parallel plunger/cylinder units 14. The pattern corresponds to the pattern of recesses of a microtiter plate according to the SBS (Society for Biomolecular Screening) specification. Each plunger/cylinder unit 14 has one cylinder 15 and one plunger 16. Each cylinder 15 has an outer thread 17 that is screwed into one of the third threaded holes 13. At the bottom, each cylinder 15 has a tube 18 that projects downward from the bottom wall 5.

A plunger 16 that seals the perimeter and is axially movable is inserted into each cylinder 15. Each plunger 16 is connected to a plunger rod 19 that projects out of the cylinder 15 at the top. Each plunger rod 19 has a plunger head 20 at the top end and a peripheral annular groove 21 underneath.

A rectangular plunger plate 22 parallel to the carrier plate 3 is arranged below the carrier plate 3. At the bottom side, the plunger plate 22 has eight channels 23 that are open at the bottom and run parallel to the rows consisting of third threaded holes 13 in the bottom wall 5.

Each channel 23 is bordered by two strip-shaped channel walls 24, and by two channel shoulders 25 that project to the inside from the bottom ends of the channel walls 24. The channel walls 24 on the two longitudinal edges of the plunger plate 22 each border the adjacent channel 23 only on one side. The other channel walls 24 each border two adjacent channels 23 on one side. Between the channel shoulders 25, each channel has one slotted opening 26.

On the short edges of the plunger plate 22, the channels 23 have front openings 27. The plunger heads 20 of the plunger rods 19 are inserted into the channels 23 through the face openings 27 so that the channel shoulders 25 engage the annular grooves 21 in a form fit. Consequently, the plungers 16 can be shifted by vertically shifting the plunger plate 22 in the cylinders 15.

From the top side of the carrier plate 3, a fastening pin 28 of a bayonet lock projects upward. In the center of the fastening pin 28, an axially shiftable threaded nut 29 is arranged, the bottom end of which is securely connected to the plunger plate 22 in order to shift the plunger plate 22 in the axial direction of the cylinders 15. Details of the fastening pin 28 will be addressed below.

At the bottom end, each tube 18 has a radially projecting peripheral supporting projection 30. This is designed as a support ring fixed on the tube.

Figure 4:
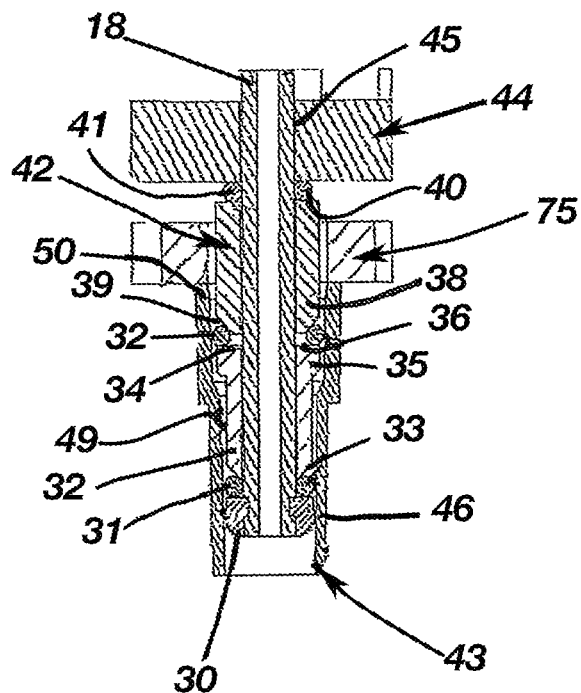
FIG. 4 shows a vertical section of an attachment of the metering head introduced into a pipette tip before securely clamping the pipette tip.

According to FIG. 4, a first O-ring 31 consisting of an elastomer material is guided on the tube 18 next to the supporting projection 30. A first sleeve 32 with a first tapering 33 at the bottom end in the form of a peripheral chamfer is guided above the first O-ring 31 on the tube 18. The first sleeve 32 can be inserted with the first tapering 33 deeper into the first O-ring 31. At the top first end 34, the first sleeve 32 has a peripheral collar 35 that in turn has a flat first face 36 at the top side. A second O-ring 37 that consists of elastomer material and is guided on the tube 18 adjoins the top side of the first sleeve.

Above this, a second sleeve 38 is guided on the tube 18. The second sleeve 38 has a second tapering 39 in the form of a chamfer at the bottom. The second sleeve 38 can be inserted with the second tapering 39 deeper into the second O-ring 37.

The second sleeve 38 has a flat, second face 40 at the top. A spacing ring 41 that is guided on the tube 18 adjoins the second face 40.

The first and the second sleeve 32, 38 consist of a rigid material, such as a metal or a plastic. The first and second O-rings 31, 37 consist of an elastomer material such as rubber, silicone or thermoplastic elastomer. The spacing ring 41 consists of an elastomer or substantially rigid material.

The tubes 18 together with the supporting projection 30, the first and second O-rings 31, 37 and the first and second sleeves 32, 38 form an attachment 42 for securely clamping pipette tips 43.

A pressure plate 44 is arranged below the bottom wall 5 and above the second sleeve 38. This has first holes 45 through which the tubes 18 of the attachments 42 are guided. The first holes 45 are dimensioned such that the pressure plate 44 lies with the edge of the first holes 45 on the top side of the spacing rings 41.

According to FIGS. 3 and 4, a pipette tip 43 is a tube 46 with a tip opening 47 at the bottom end and a mounting opening 48 at the top end. The pipette tip 43 has a sealing seat 49 on the inside adjacent to the mounting opening 48. The inner diameter and the outer diameter of a pipette tip 43 generally expand from the tip opening 47 to the mounting opening 48. In the example, the pipette tip 43 has a plurality of conical and cylindrical regions, as well as a cylindrical expansion 50 in the proximity of the top end.

Figure 5:
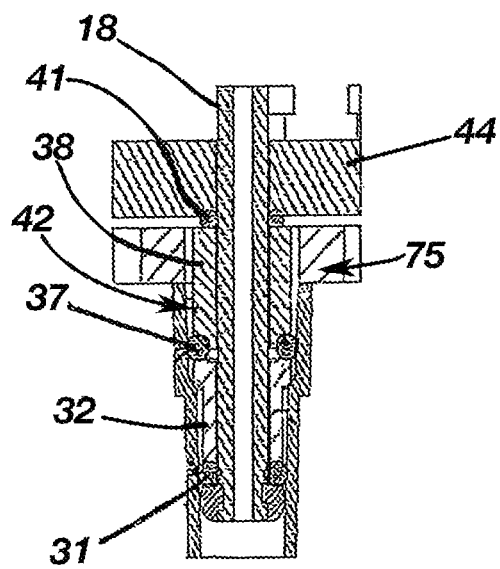
FIG. 5 shows a vertical section of the attachment securely clamped in the pipette tip.

According to FIG. 4, an attachment 42 of the metering head 1 is introduced through the mounting opening 48 into the pipette tip 43. The O-rings 31, 37 are arranged at the height of the sealing seat 49. According to FIG. 5, the first and second sleeves 32, 38 are shoved downward by shifting the pressure plate 44 downward so that the first and second O-rings 31, 37 are pressed together axially and expanded in the peripheral direction. This sealingly clamps the mounted pipette tip 43 securely to the attachment. By lifting the pressure plate 44, the clamping of the pipette tip 43 to the attachment 42 can be released.

According to FIGS. 1 to 3, there is a shifting apparatus 51 to shift the pressure plate 44 in a vertical direction. This has four guide shafts 52 that are securely connected to the pressure plate 44. Each guide shaft 52 is screwed in at the bottom to the pressure plate 44. Each guide shaft 52 is guided with low friction in a recirculating ball gear 53 which is held in the carrier housing 4.

The four guide shafts 52 are guided through first through-holes 54 in the bottom wall 5 and second through-holes 55 in the carrier plate 3 and project upward above the carrier plate 3. There, each guide shaft 52 is connected to a gate element 56 that has a gate base 57 at the bottom into which the guide shaft 52 is screwed. On the top side of the gate base 57, each gate element 56 has a gate 58 in the form of a slot.

Four gates 58 are arranged symmetrically relative to the fastening pin 28 on the longitudinal edges of the carrier plate 3.

On the top side of the carrier plate 3, first shafts 61 are mounted in two first bearing blocks 59 in each case with first ball bearings 60 held therein. The first shafts 61 each bear at their ends an eccentric disk 62 with an eccentric 63 arranged thereon. A second ball bearing 64 is mounted on each eccentric 63 and engages in a gate 58.

Each eccentric disk 62 has a first worm wheel 65 on the perimeter. The two first worm wheels 65 are arranged in a plane.

Within this plane above the two worm wheels 65 is a second shaft 66 on which two first screws 67 are formed that mesh with the worm wheels 65. The second shaft 66 is mounted in the second bearing blocks 68 that are fixed to the top edge of the first bearing blocks 59 which bear the first shafts 61 in addition to the worm wheels 65.

A second worm wheel 69 sits on the end of the second shaft 66. The second worm wheel 69 meshes with a second screw 70 which is fixed to the motor shaft 71 of an electric motor 72 which is aligned parallel to the first shaft 61.

The rotational movement of the motor shaft 71 of the electric motor 72 is transmitted by the second shaft 66 to the first shafts 61. These shift the pressure plate 44 via the eccentric gearing 73 with eccentrics 63 and gates 58 and the guide shafts 52. By driving the electric motor 72 in different directions, the pressure plate 44 can accordingly be lifted or lowered. This can fix or release the pipette tips 43 on the attachments 42.

The first shifting apparatus 51 accordingly comprises all the components from the guide shafts 52 to the electric motor 72 that cause the shifting of the pressure plate 44. The first shifting apparatus 51 and the pressure plate 44 together form a second shifting apparatus 74 for shifting the sleeves 32, 38.

A rectangular stop plate 75 is arranged below the pressure plate 44. The stop plate 75 has second holes 76 in which the attachments 42 engage. The second holes 76 are dimensioned such that the attachments 42 including the supporting projections 30, the first and second O-rings 31, 37 and the first and second sleeves 32, 38 can be inserted through the second holes 76.

The stop plate 75 can be shifted in a vertical direction. In a stop position that is located further upward, the stop plate 75 serves as a stop for mounting pipette tips 43. In an ejection position that is located further below, the stop plate 75 presses all the pipette tips 43 off the attachments 42.

Figure 6:
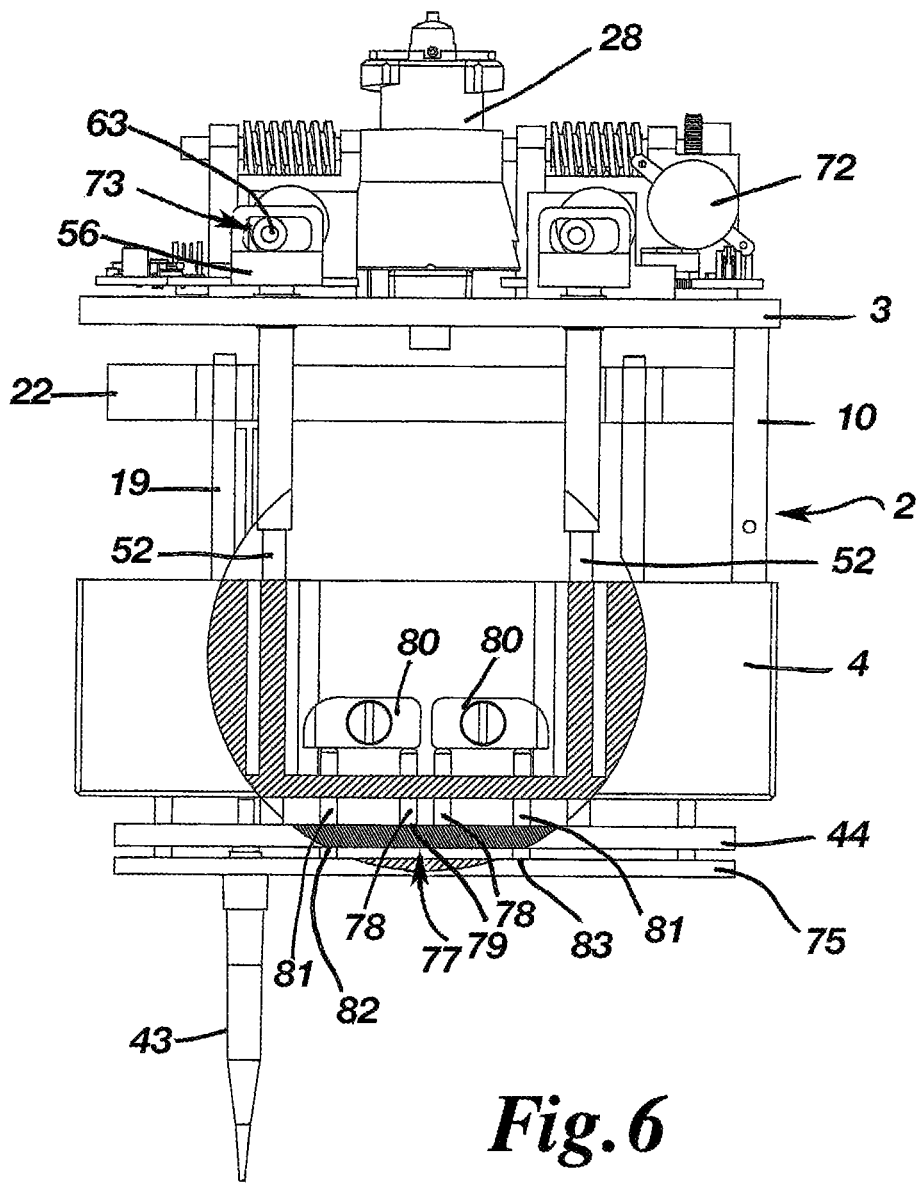
FIG. 6 shows the metering head with a pipette tip securely attached in a partially cutaway front view.
Figure 7:
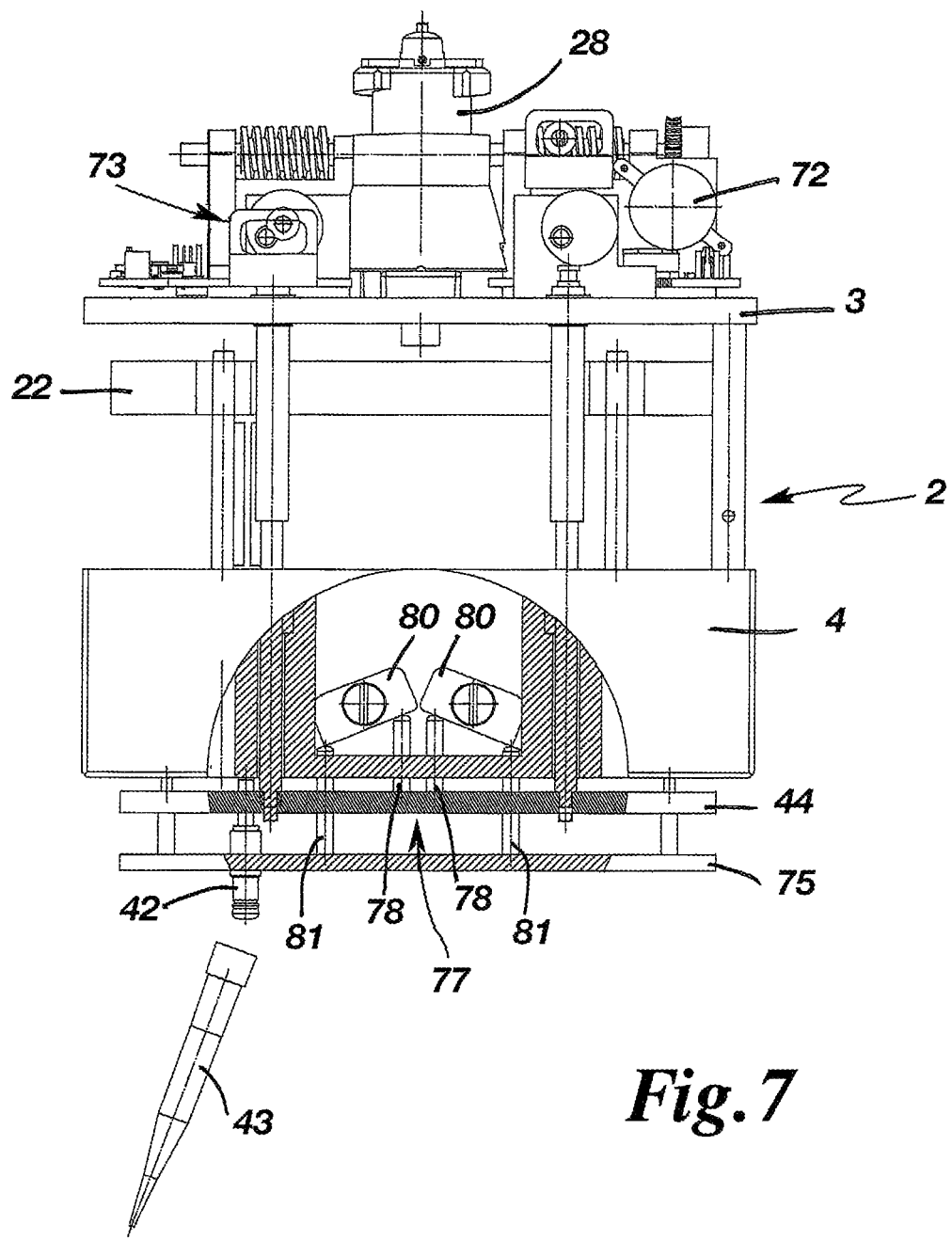
FIG. 7 shows the metering head during the ejection of the pipette tip in a partially cutaway front view.
Figure 8:
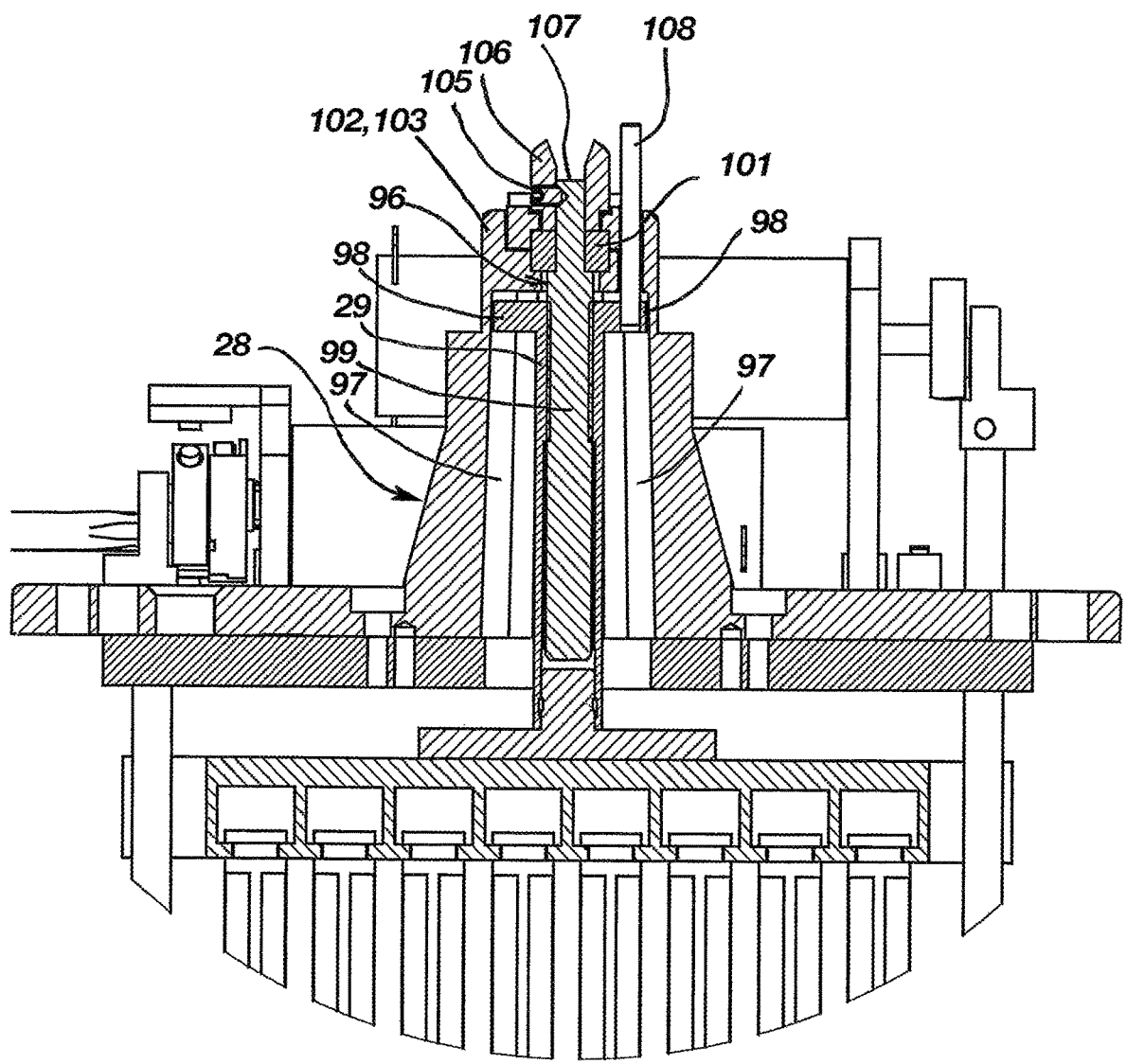
FIG. 8 shows a vertical section of a top part of the metering tool comprising a fastening pin and a plunger plate.

According to FIGS. 6 and 7, there is a third shifting apparatus 77 to shift the stop plate 75 in a vertical direction. This comprises transmission shafts 78, wherein two transmission shafts 78 project upward from each longitudinal side of the pressure plate 44. The transmission shafts 78 are screwed in by their bottom ends into threaded holes 79 of the pressure plate 44.

The top ends of the transmission shafts 78 lie loosely against the ends of rocker arms 80 that are pivotably mounted on the insides of the bearing housing 4. The other ends of the rocker arms 80 lie loosely against the top ends of ejection shafts 81 that are guided through third through-holes 82 in the pressure plate 44, and the bottom ends of which are screwed into fourth threaded holes 83 in the stop plate 75.

According to FIG. 3, the stop plate 75 adjoins the bottom wall 5 of the carrier housing 4 via four spring elements 84. The spring elements 84 each have a guide rod 85 that is screwed at its bottom end into a fifth threaded hole 86 in the stop plate 75. A plate 87 is fixed to the top end of the guide rod 85. A pretensioned first helical spring 88 that presses the stop plate 75 upward is guided on the guide rod 85 between the plate 87 and the top side of the bottom wall 5. The shifting of the stop plate 75 upward is limited by the stop plate 75 adjoining the pressure plate 44 by means of the ejection shafts 81 guided through the through-holes 82 in the pressure plate 44, the rocker arm 80 and the transmission shafts 78 projecting upward from the pressure plate 44.

When the pipette tips 43 are being mounted, the pressure plate 44 is in the release position, and the stop plate 75 is in the stop position according to FIGS. 4 and 6. The pipette tips 43 can be shoved onto the attachments 42 until lying against the stop plate 75.

By means of the eccentric gearing 73 and the guide shafts 52, the pressure plate 44 is shifted downward to the clamping position and thereby securely clamps the pipette tips 43 to the attachments 42. In so doing, the stop plate 75 is prevented from escaping upward out of the stop position by a stop apparatus with stop elements that project downward from the bottom wall 5. This situation is shown in FIGS. 2, 3, 5 and 6.

To eject the pipette tips, the pressure plate 44 is shifted upward to the release position. In so doing, the clamping of the pipette tips 43 on the attachments 42 is released. At the same time, the transmission shafts 78 tip the rocker arms 80, and the latter shifted the ejection shafts 81 and hence the stop plate 75 downward into the ejection position. This scrapes the pipette tips 43 off of the attachments 42. This situation is shown in FIG. 7.

To again pick up pipette tips 43, the guide shafts 52 are lifted until the pressure plate 44 reaches the release position, and the stop plate 75 reaches the stop position in FIG. 1.

According to FIGS. 1 to 3 and 8, the fastening pin 28 has a cylindrical top pin section 91 at the top. On the outer perimeter, the top pin section 91 bears two partially peripheral connecting elements 92 that are offset to each other by 180° and project radially to the outside in order to form a bayonet connection 93. The connecting elements 92 have a slight thread pitch at the bottom side to be tightened with a fitting connecting element in a pin holder of a bayonet connection.

Adjacent to the top pin section 91, the fastening pin 28 has a cylindrical, middle pin section 94 with a larger outer diameter than the top pin section 91.

Underneath, the fastening pin 28 has a bottom pin section 95 that expands conically downward. The bottom pin section 95 is fixed at its base to the top side of the carrier plate 3.

A central hole 96 extends in the longitudinal direction of the fastening pin 28. This has two diametrically opposed longitudinal grooves 97.

The sleeve-like threaded nut 29 is inserted in the central hole 96 and is guided by two radially projecting wings 98 at its top end in the longitudinal grooves 97.

Furthermore, a spindle 99 is screwed into the threaded nut 29. Above its thread, this has a projecting bearing pin 100 by which it is mounted in a third ball bearing 101. The third ball bearing 101 is held in a bearing bushing 102 of a bearing carrier 103 that has two tabs 104 that project diametrically from the sides and lie on the top edge of the top pin section 91 and are fixed thereto by means of screws.

On a part of the bearing pin 100 that projects beyond the third ball bearing 101, a driver 106 is fixed non-rotatably by means of a radial threaded pin 105 and has a slot 107 extending radially and axially in its top face for introducing a pawl-like drive unit.

The spindle 99 adjoins the face of the third ball bearing 101. The driver 106 adjoins the top side of the bearing carrier 103. The spindle 99 is held hereby in the fastening pin 28 so as to not be axially shiftable.

In one wing of the threaded nut 29, a cylinder pin 108 is fixed that is guided by a groove 109 in the bearing carrier 103 oriented parallel to the middle axis of the threaded nut 29 and projects upward out of the fastening pin 28.

By rotating the driver 106, the spindle 99 that is axially fixed in the fastening pin 28 moves the threaded nut 29 that is non-rotatably guided in the fastening pin 28 in an axial direction. This shifts the plunger plate 22 and the plunger 16 is shoved in the cylinders 15. By rotating the driver 106 in different directions, the plungers 368 16 can be shifted in different directions in the cylinders 15. By scanning the position of the cylinder pin 108, it is possible to determine the respective position of the plunger 16 in the cylinders 15.

The fastening pin 28 and the drive with the threaded nut 29 and spindle 99 integrated therein correspond to the exemplary embodiments in FIGS. 1 to 4 as well as 6 according to EP 1 407 861 B1. The relevant description is included in the present application by means of reference.

A metering machine or laboratory machine is provided with a complementary pin holder of a bayonet lock that is connectable to the fastening pin. Preferably, the complementary connecting part corresponds to the tool holder according to FIGS. 7 to 10 of the aforementioned patent. The relevant description is included in the present application by means of reference.

Figure 9:
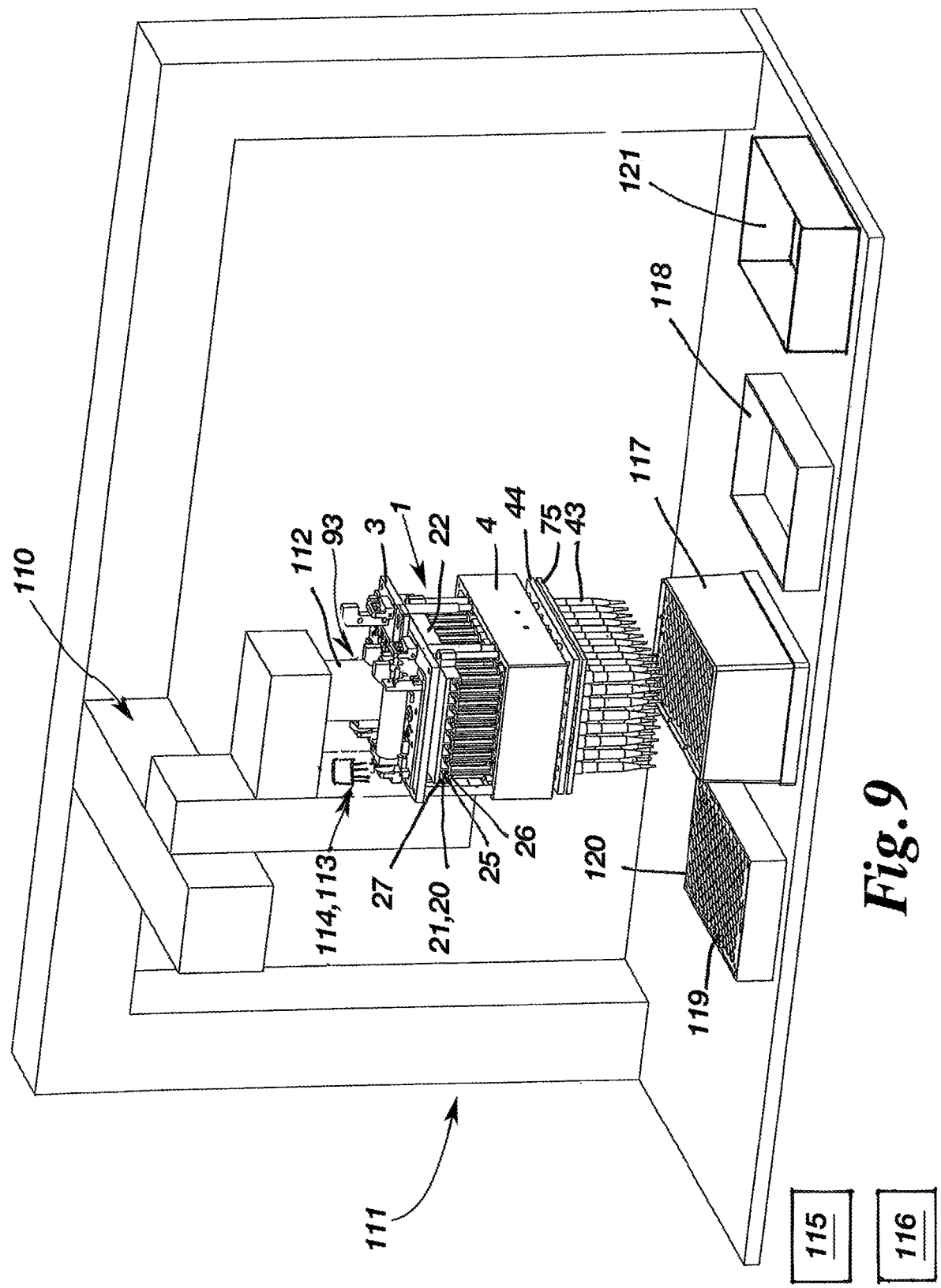
FIG. 9 shows the metering head in a metering machine in a perspective view diagonally from the top and from the side.

According to FIG. 9, the metering head 1 is coupled to a three-axis transfer unit 110 of a metering machine 111. For this, the fastening pin 28 is held in a corresponding pin holder 112 on the three-axis transfer unit 110. Additional apparatuses for coupling first plug-in connections 113 and second plug-in connections 114 of an electrical power supply 115 of the metering machine for the electric motor 72 and an electric control apparatus 116 of the metering machine 111 with the metering head 1 are also in the three-axis transfer unit 110. By means of the second plug-in connections 114, for example signals from a rotary encoder that detects the rotational position of the motor shaft 71 are transmitted to the control apparatus 110, and motor control signals are transmitted from the control apparatus 116 to a motor control on the metering head 1.

With the assistance of the metering machine 111, pipette tips 43 can be automatically picked up and ejected, and liquids can be metered. In FIG. 9, the metering head 1 is lifted out of a holder 117 with the clamped-on pipette tips 43 after picking up pipette tips 43. The metering head 1 can be moved to draw liquids from a reservoir 118 such that the tip openings dip in the storage container 118. After drawing liquid, the metering head 1 with the pipette tips 43 can be moved into the wells 119 of a microtiter plate 120 in order to dispense liquid into the wells. The liquid can be further processed in the microtiter plate 120, for example mixed with other liquids, or physically, chemically or biochemically treated or analyzed. Finally, the metering head 1 can be moved over a waste container 121, and the pipette tips 43 can be ejected into the waste container 121.

The metering heads of manual pipettes are described below.

According to FIGS. 10 to 17, the metering head 1 has a first housing 122 that is formed from a front and a rear housing shell 123, 124 that are joined in a vertical plane. The rear housing shell 124 is removed in FIGS. 10 to 15.

Eight parallel plunger/cylinder units 14 are arranged in a row in a metering head 1. Each plunger/cylinder unit 14 has one cylinder 15 in which a plunger 16 is movably arranged.

Figure 12:
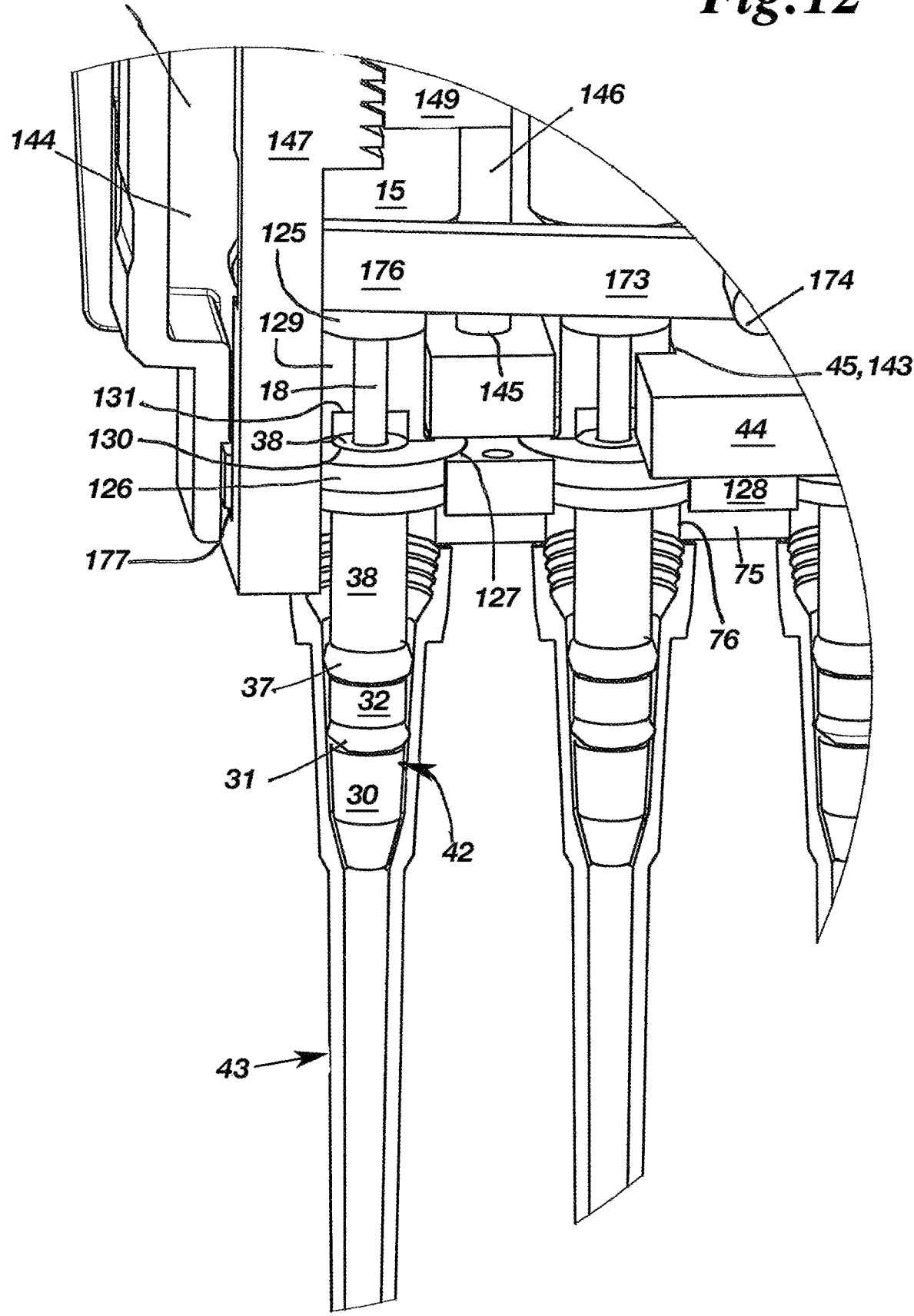
FIG. 12 shows an enlarged detail from FIG. 11.
Figure 16:
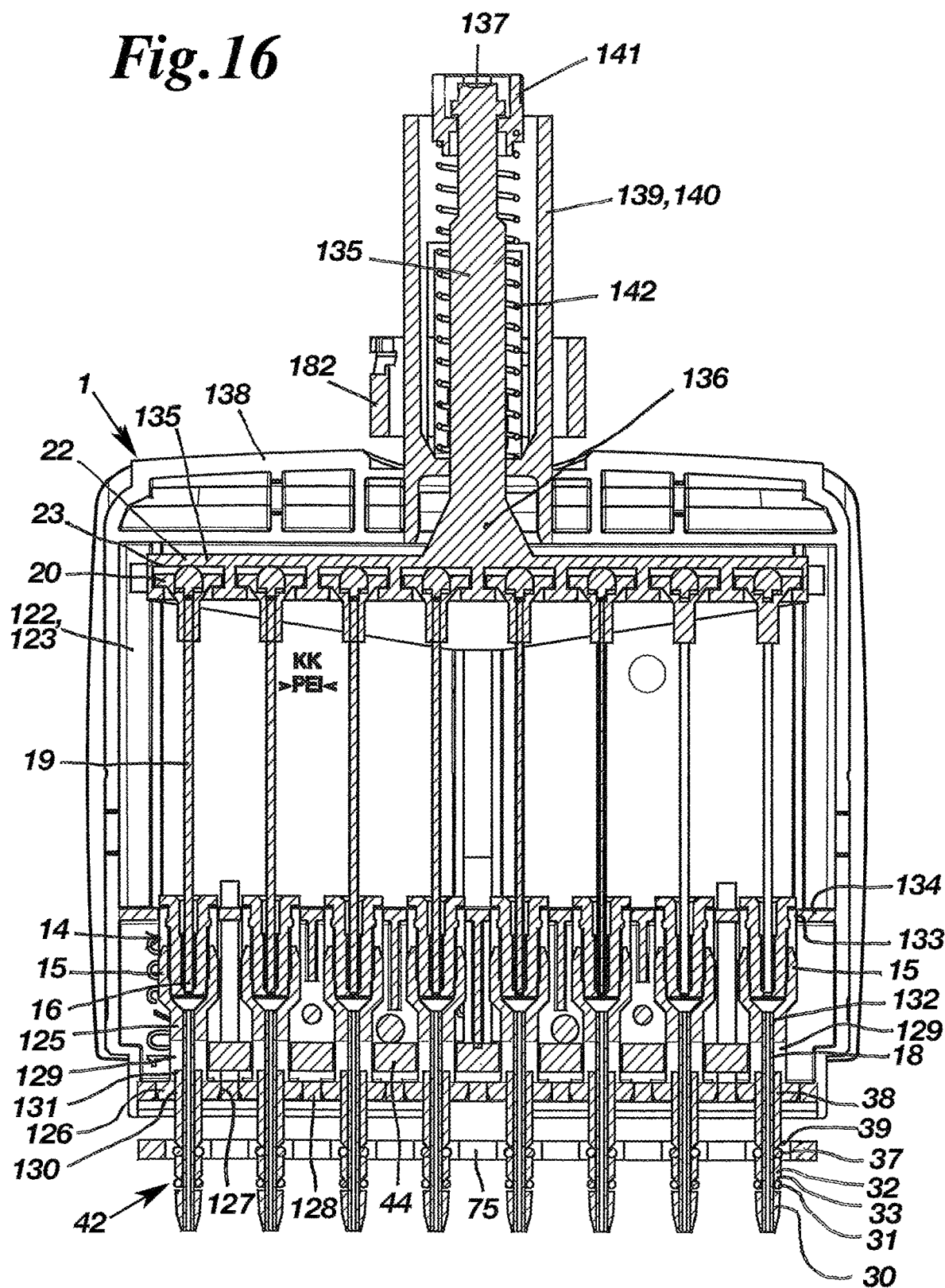
FIG. 16 shows a vertical section of the same metering head.

According to FIGS. 12 and 16, each cylinder 15 is connected at the bottom by a pin 125 to a circular disk 126 that tapers conically downward. Each circular disk 126 is inserted from above into a correspondingly-shaped fourth through-hole 127 in a horizontal, bottom housing wall 128 of the housing 122 and fixed therein, for example by clamping.

Each pin 125 has a flattening 129 on the rear side above the circular disk 126.

Each circular disk has a vertical, central fifth through-hole 130. An extension 131 of the fifth-through-hole 130 extends into the flattened part of the pin 125. Due to the flattening 129, only one-half of the fifth through-hole 130 extends into the pin 125.

A tube 18 that is exposed in the region of the flattening 129 extends from the bottom end of each cylinder 15 in a vertical through-channel 132 of the pin 125. The tube 18 extends through the fifth through-hole 130 and projects downward from the bottom housing wall 128.

At the bottom end, each tube has a peripheral supporting projection 30. This is for example designed as a conical sleeve fixed to the tube 18.

Above that, an elastomer first O-ring 31 is arranged on the tube 18. Above that, there is a first sleeve 32 on the tube 18 that has a peripheral, first tapering 33 at the bottom end. Above that, an elastomer second O-ring 37 sits on the tube 18. Above that, in turn a second sleeve 38 is guided on the tube 18 which has a peripheral second tapering 39 on the bottom end. The second sleeve 38 engages in the fifth through-hole 130 in the circular disk 126.

The second sleeve 38 can be shoved upward to the top end of the extension 131 of the fifth through-hole 130. In the pushed-up position, one-half of the second sleeve 38 is exposed next to the flattening 129.

Each tube 18 with the supporting projection 30, first and second sleeve 32, 38 and the first and second O-rings 31, 37 form an attachment 42.

Each cylinder 15 is guided at its top end in a sixth through-hole 133 of a horizontal support plate 134 of the front housing shell 123.

Each plunger 16 bears a plunger rod 19 that has a plunger head 20 at the top end. The plunger heads 20 are held in channels 23 of a horizontally oriented strip-shaped plunger plate 22. A rod 135 projects upward from the strip-shaped plunger plate 22. The strip-shaped plunger plate 22 and the rod 135 are components of the plunger actuator 136. At the top, the plunger actuator 136, or respectively the rod 135 has a contact surface 137 for the bottom end of a lifting rod of a pipette top part.

A sleeve-shaped holding element 139 through which the rod 137 extends projects upward from a horizontal top housing wall 138. The holding element 139 has first means for releasably connecting 140 to a pipette top part.

A sleeve-shaped abutment element 141 is releasably held to the top end of the rod. Between the sleeve-shaped holding element 139 and the rod 135, a second helical spring 142 is arranged that adjoins a top housing wall 138 of the first housing 122 at the bottom, and adjoins the abutment element 141 under pretension at the top.

By pressing against the contact surface 137 from above, the rod 135 can be shifted downward opposite the effect of the second helical spring 142, and hence the plunger 16 can be shifted lower in the cylinder 15. After relieving the contact surface 137, the rod 135 and hence the plunger 16 can be shifted back into the original position by the second helical spring 142.

The above-described components of the metering head 1 are held on the front housing shell 123.

Moreover, the metering head 1 has a horizontal pressure plate 44. The pressure plate 44 engages against the flattenings 129 of the pins 125, and its bottom side lies on the top sides of the second sleeves 38 (FIG. 12). In the region of the pins 125, the pressure plate 44 has first holes 45 in the form of lateral cutouts 143 through which the tubes 18 extend. The pressure plate 44 extends to the side of the pins 125 toward the front housing wall 144 of the metering head 1. The pressure plate 44 has vertical guide holes 145 that are guided on vertical guide pins 146 in the housing 122.

A horizontal stop plate 75 is arranged below the horizontal, bottom housing wall 128. This has two holes 76, wherein an attachment 42 extends centrally through each second hole 76.

Racks 147 project upward vertically from the two ends of the stop plate 75. The racks 147 have first teeth 148 on sections that project laterally like a fan. The racks 147 are securely connected to the stop plate 75.

Figure 10:
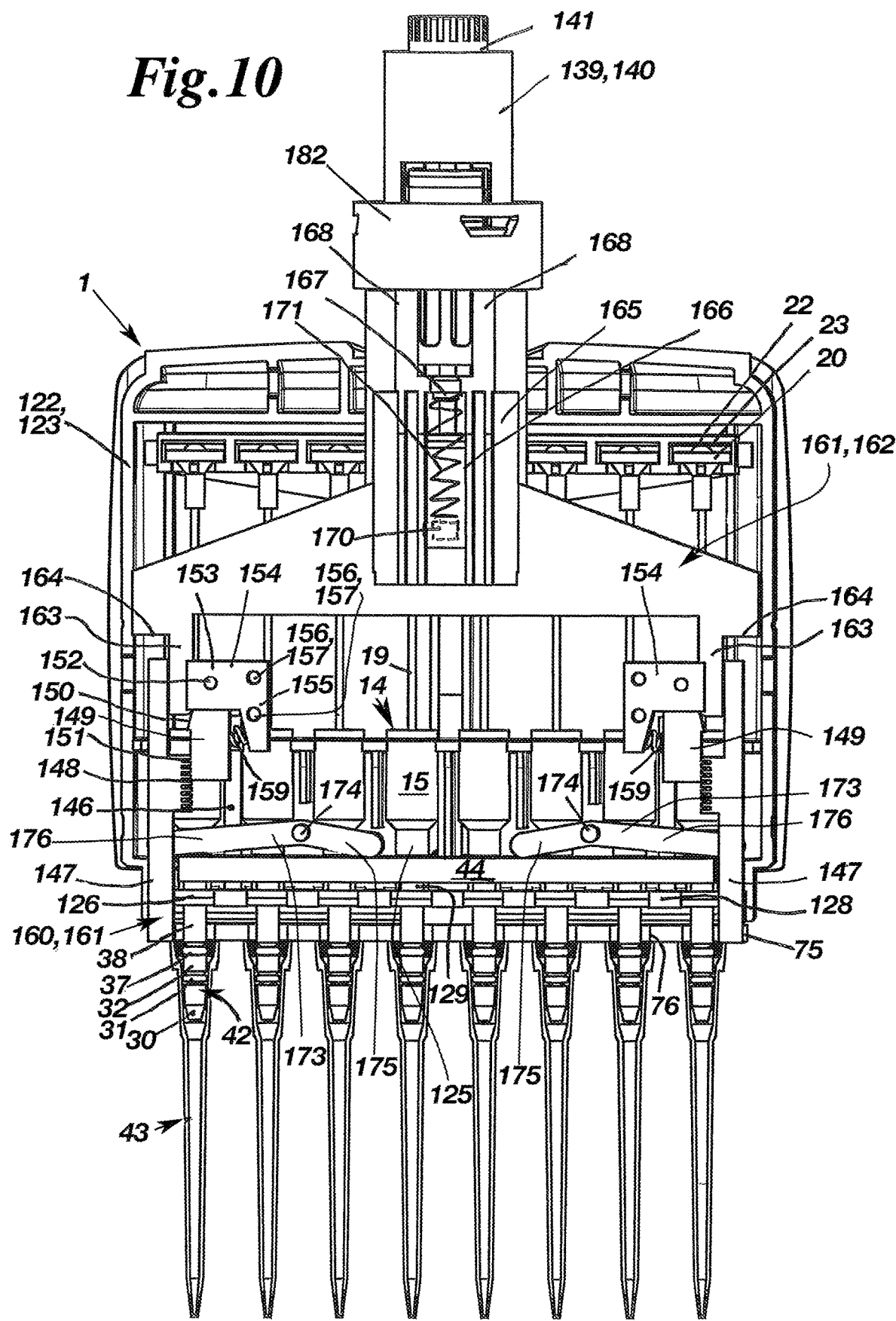
FIG. 10 shows a rear view of another metering head without a rear housing shell when picking up pipette tips.

In addition to first teeth 148 of the racks 147, pivotable pawls 149 are mounted in the housing 122. Each pawl 149 is prism-shaped with a rectangular main surface and a bevel on one side that forms a first wedge element 150 (FIG. 10, 13, 14, 15). The bottom end of each wedge element 150 projects slightly relative to the adjacent lateral edge of the pawl 149. On the side of the first wedge element 150, each pawl has second teeth 151. This side faces the first teeth 148 of the adjacent pawl 147.

Each pawl 149 is mounted on a horizontal first shaft 152 that projects from a first leg 153 of an angled bearing carrier 154. In the second leg 155, the bearing carrier 154 has eyes 156 for securing to retaining pins 157 which project inward from the rear housing wall 158 of the first housing 122. An end of a third helical spring 159 adjoins the second leg 155. The other end of the third helical spring 159 is mounted in a blind hole in a narrow side of the pawl 149 mounted on the same bearing carrier 154. By means of the third helical spring 159, the pawl 149 is pretensioned toward the adjacent rack 147.

The stop plate 75 and the racks 147 are a first ejector part 160 of an ejector 161 (FIG. 10). Moreover, the ejector 161 comprises a second ejector part 162 that is designed as a crossmember. Two ejector rods 163 project vertically downward from the horizontal, bottom edge of the second ejector part 162. The ejector rods are arranged close to the lateral edges of the second ejector part 162. At the bottom edge next to the ejector rods 163, this has protrusions 164 above the racks 147.

An actuating element 165 in the form of a shaft projects upward centrally from the top edge of the second ejector part 162. This has a flat front side flush with the front side of the second ejector part 162 and a rear side that curves slightly cylindrically outward relative to the rear side of the top ejector part 162. In the bulging rear side, the actuating element has a vertically extending first recess 166 that is bordered at the top by a first abutment 167.

At the top, the actuating element 165 has two strip-shaped transmission elements 168 that project upward and are hollow-cylindrical in a horizontal section.

Figure 17:
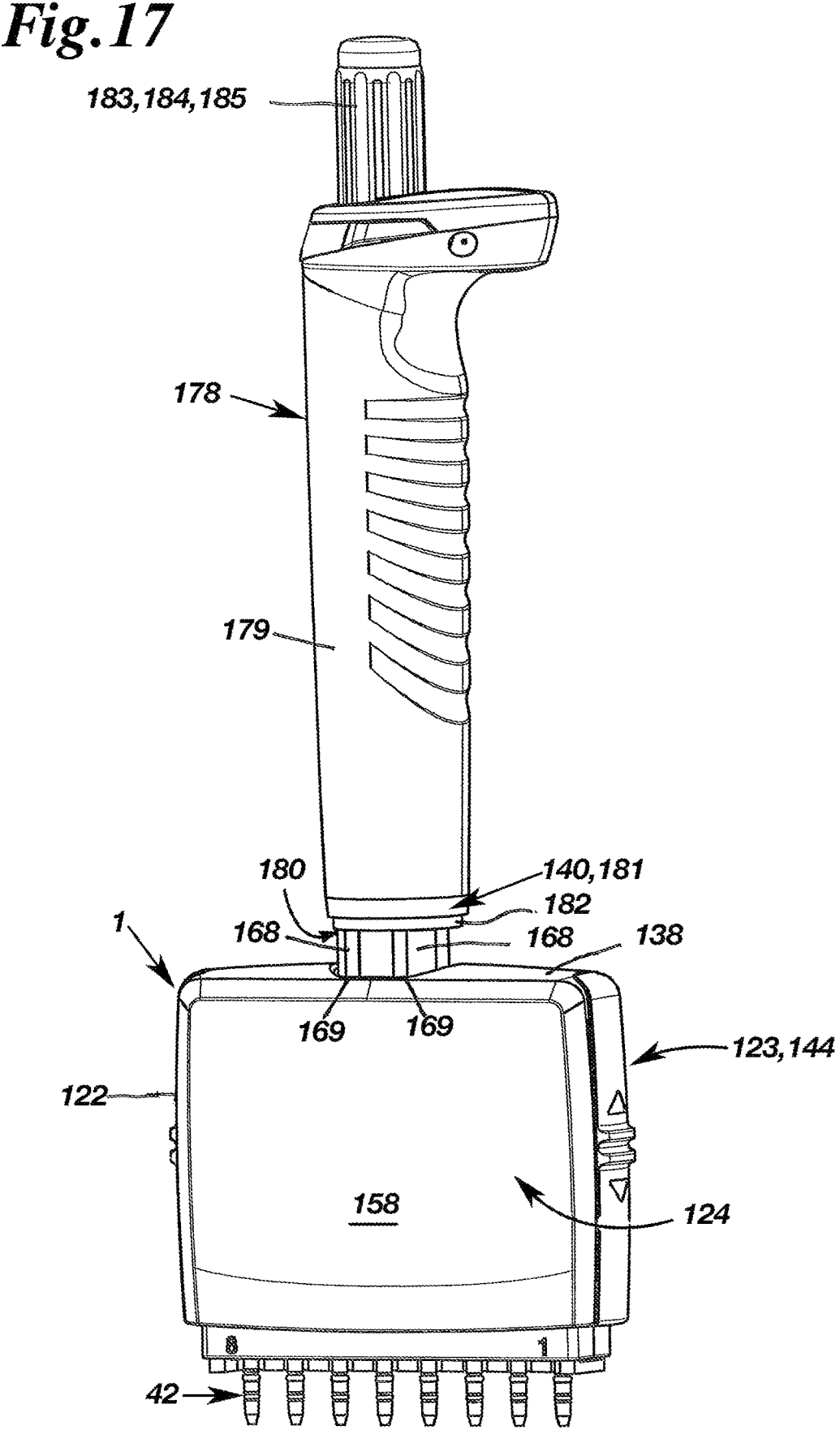
FIG. 17 show the metering head on a mechanical manual pipette in a perspective view diagonally from the rear.

The actuating element 165 is guided by the transmission elements 168 through arc-shaped slots 169 in the horizontal, top housing wall 138 next to the holding element 139 (FIG. 17).

The rear housing wall 158 has a second abutment 170 on the inside. This is additionally drawn in FIG. 10 even though it shows the metering head 1 without a rear housing wall. Between the second abutment 170 and the first abutment 167 of the actuating element, a fourth helical spring 171 is held under pretension in the recess 166. The fourth helical spring 171 strains against the second ejector part 162 so that it is pressed upward into the position in FIG. 1.

Figure 13:
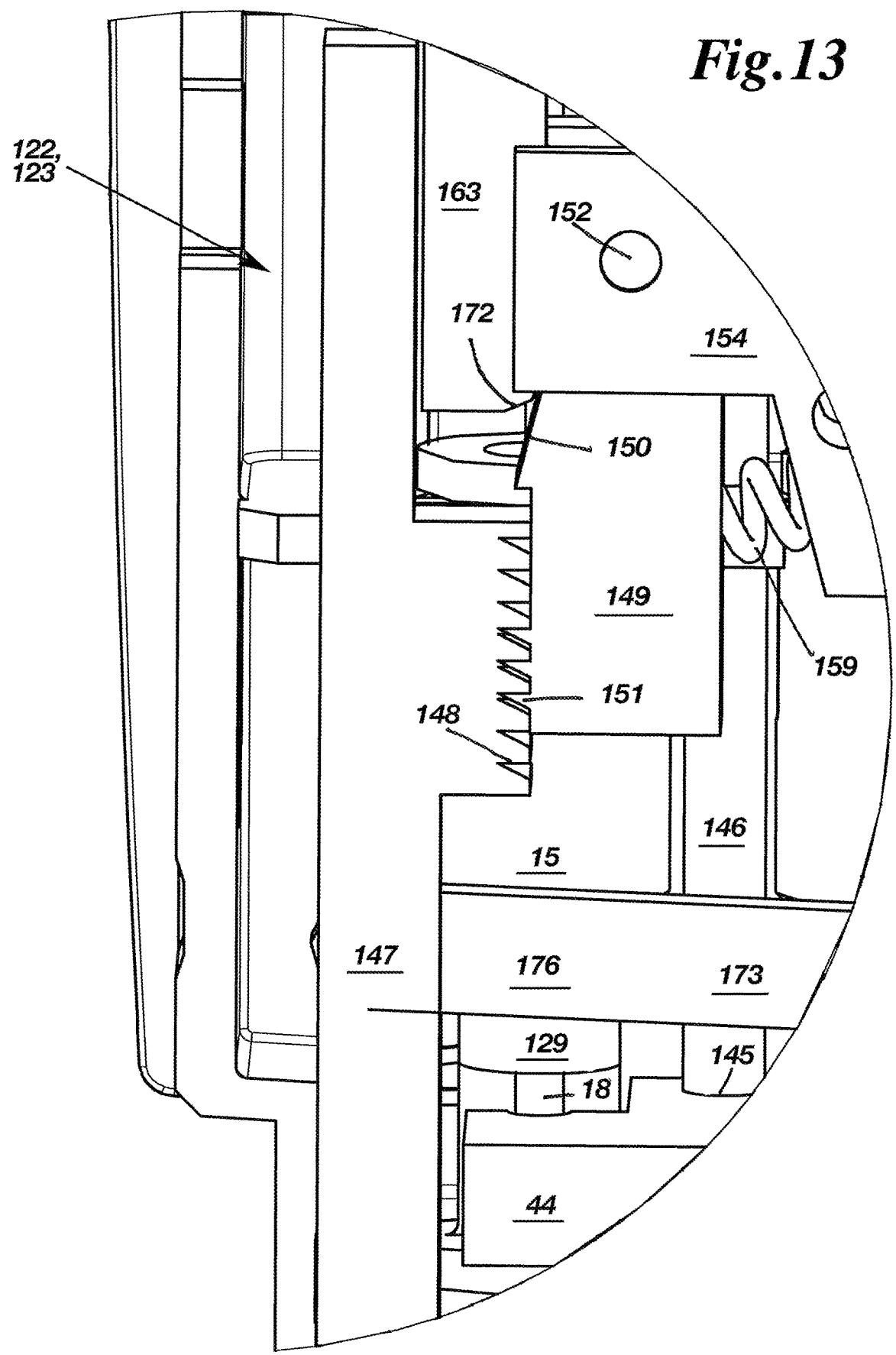
FIG. 13 shows another enlarged detail from FIG. 11.

The ejector rods 163 are provided at the bottom on the sides facing each other with two wedge elements 172 in the form of radii or bevels (FIG. 13). When the second ejector part 162 is shifted downward, the ejector rods 163 with their second wedge elements 172 slide over the first wedge elements 150 of the pawls 149.

Furthermore, two angle levers 173 are pivotably mounted on two horizontal second shafts 174 that project from the inside of the rear housing wall 158 (FIG. 10). Each angle lever 173 has a short, first lever arm 175 that lies against the top side of the pressure plate 44 by a radius on its free end. Each angle lever 173 has a long second lever arm 176 that, by a radius on its front end, rests on the bottom edge of a horizontally extending second recess 177 in the front side of a rack 147 (FIG. 12).

According to FIG. 17, the metering head 1 is connected to a pipette top part 178. The pipette top part 178 has a second housing 179 that is formed as a handle and is substantially rod shaped. At the bottom end, the second housing 179 has a housing opening 180 into which the sleeve-shaped holding element 139 is inserted. In the interior of the housing top part 179, there are second means for releasably connecting 181 that are releasably connected to the first means for releasably connecting 140 of the sleeve-shaped holding element 139. Furthermore, the pipette top part 138 has an ejector sleeve 182 that projects slightly at the bottom from the housing opening 180. The transmission elements 168 of the actuation element 165 lie by their top edges on the bottom edge of the ejector sleeve 182.

The pipette top part 178 comprises a first drive apparatus 183 for displacing the plunger 16 in the cylinders 15 of the metering head 1 and a second drive apparatus 184 for displacing the ejector 161.

The first drive apparatus 183 and the second drive apparatus 184 have a metering button 185 that projects upward from the top end of the second housing 179. The metering button 185 can be shifted vertically downward lower into the second housing 179 by being actuated with the thumb. The metering button 185 is coupled to a lifting rod that, by its bottom end, lies against the contact surface 137 of the rod 135 of the metering head 1.

At the beginning of pressing in the metering head, the plunger 16 is shifted in the cylinders 15 in order to execute a metering stroke. The metering stroke can be adjusted by rotating the metering button 185. The displacement is counter to the effect of a return spring so that the lifting rod is independently shifted upward after releasing the metering head 185. Upon releasing the metering head 185, the plungers 16 in the cylinders 15 are also independently shifted back upward by the two helical springs 142. By pressing and releasing the metering head 185, air can be pressed out of or sucked into the plunger/cylinder unit 14 in order to drain, or respectively fill pipette tips 43.

After the set metering stroke is exhausted, an overstroke can be executed counter to the effect of another spring arranged in the second housing 179 by further pressing the metering button 185 in order to blow residual liquid out of the pipette tips 43.

After executing the overstroke, the ejector sleeve 182 can be shifted downward by pressing the metering button 185 in order to actuate the ejector 161. Since both the displacement of liquid as well as the ejection of pipette tips can be controlled by the same metering button 185, the pipette is a single button pipette.

With regard to the additional possible embodiments of the pipette top part 178, reference is made to paragraphs 53 to 62 in EP 2 735 369 B1, the content of which is hereby incorporated in this application.

The user grasps the second housing 179 with a hand so that he can press the thumb against the top end of the metering button 185. The metering button 185 is introduced with the attachments 42 into the mounting openings 48 of pipette tips 43 that are provided in a holder. Stops on the racks 147 prevent a downward shifting of the stop plate 75.

According to FIG. 10, the pipette tips 43, while being shoved further on the attachments 42, shifted the stop plate 75 upward. The first teeth 148 of the racks 147 thereby engage with the second teeth 151 of the pawls 149. The angle levers 173 transmit the movement of the racks 147 upward to the pressure plate 44 so that it is shifted downward. By shifting the pressure plate 44 downward, the sleeves 32, 38 are shifted downward, and the O-rings 31, 37 are expanded radially which securely clamps the pipette tips 43 on the attachment 42.

When the pipette tips 43 are shoved on further, the racks 147 travel further upward along the pawls 149 so that they repeatedly engage, and the stop plate 75 does not fall back into the starting position in FIG. 10.

Figure 11:
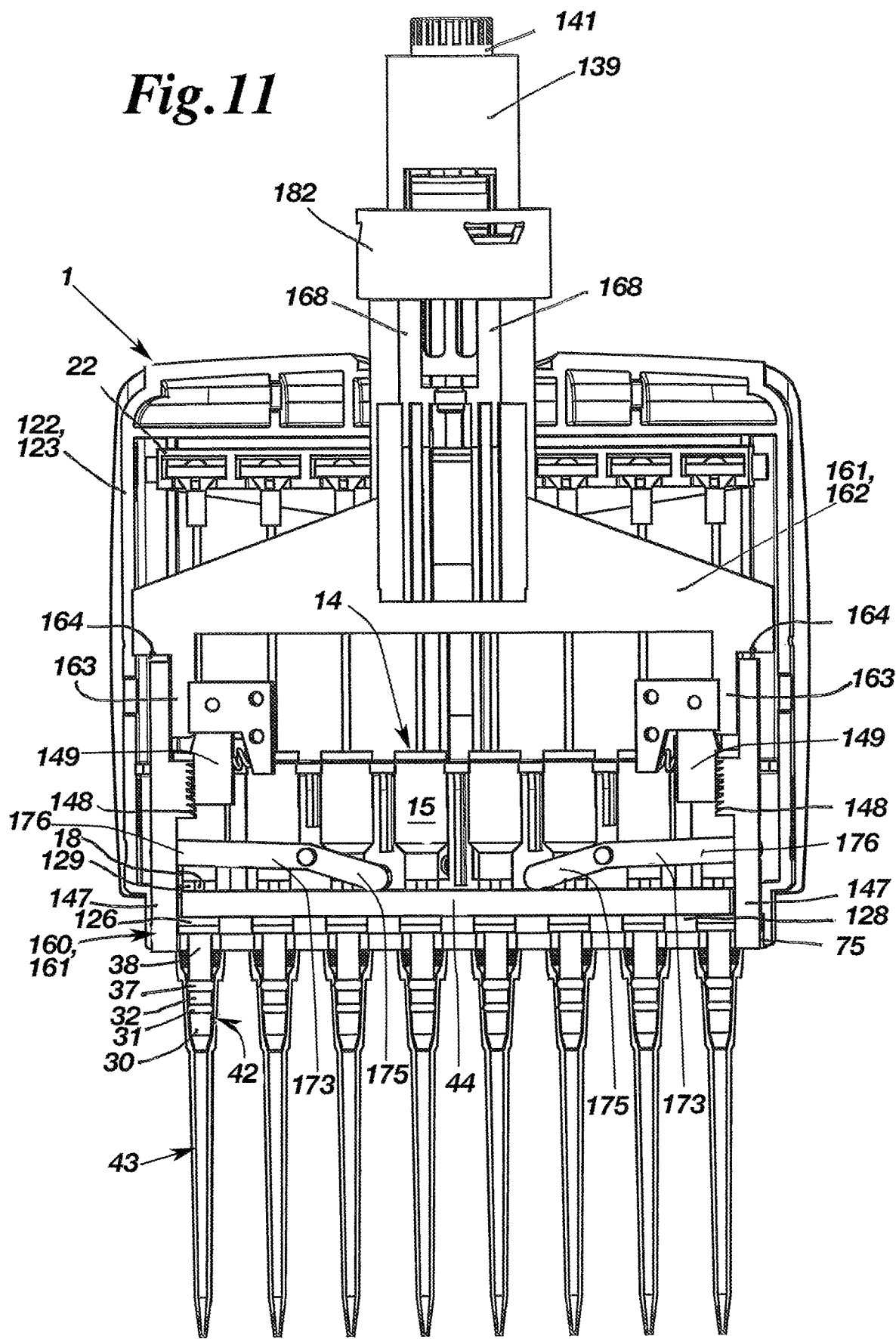
FIG. 11 shows a rear view of the metering head without a rear housing shell with clamped-on pipette tips.

The clamping of the pipette tips 43 is limited by contacting the stop plate 75 on the bottom housing wall 128. This is shown in FIG. 11. In this position, the O-rings 31, 37 are expanded to the maximum, and the pipette tips 43 are clamped securely with the greatest force.

Figure 14:
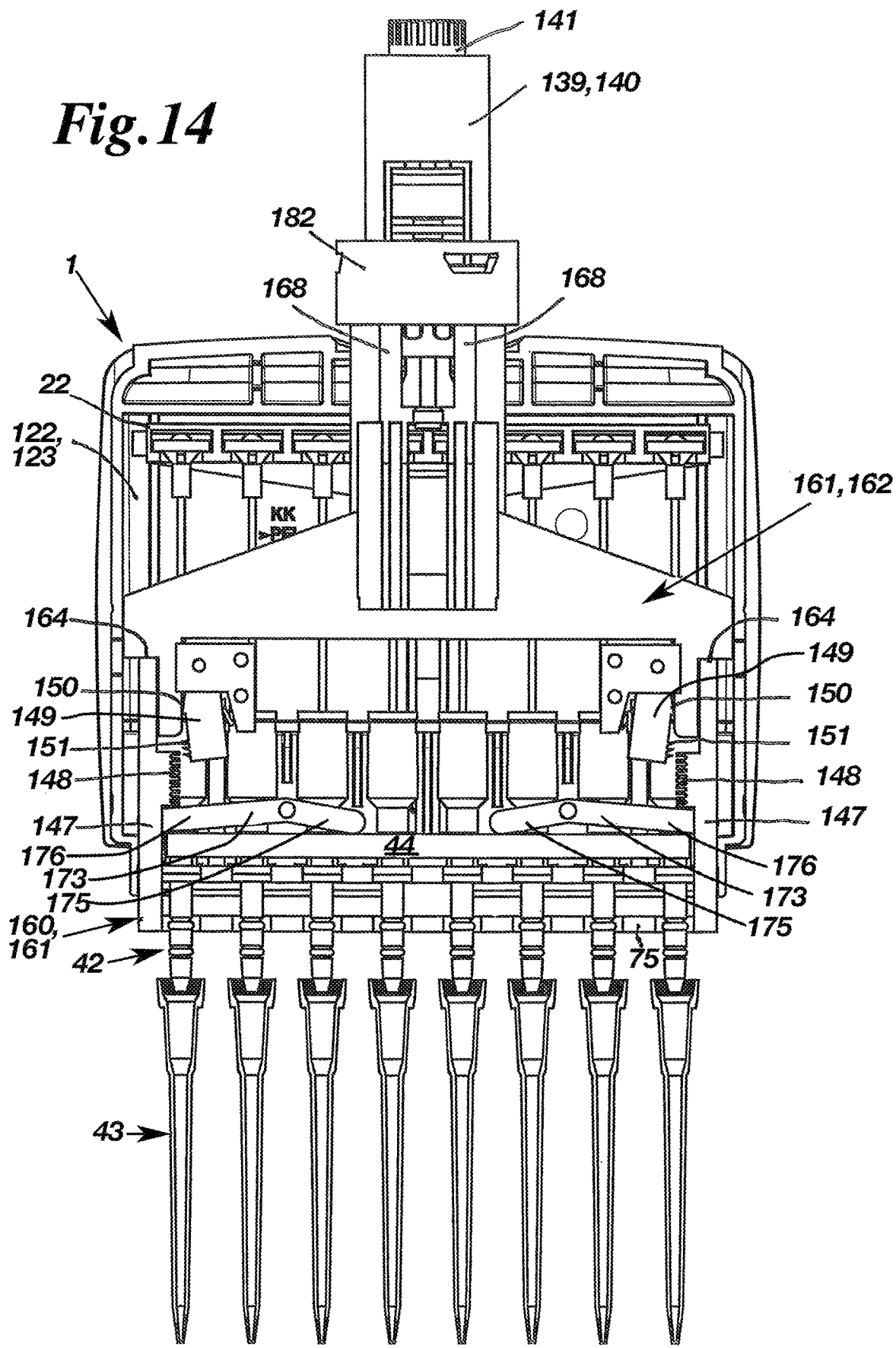
FIG. 14 shows a rear view of the metering head without a rear housing shell while ejecting pipette tips.
Figure 15:
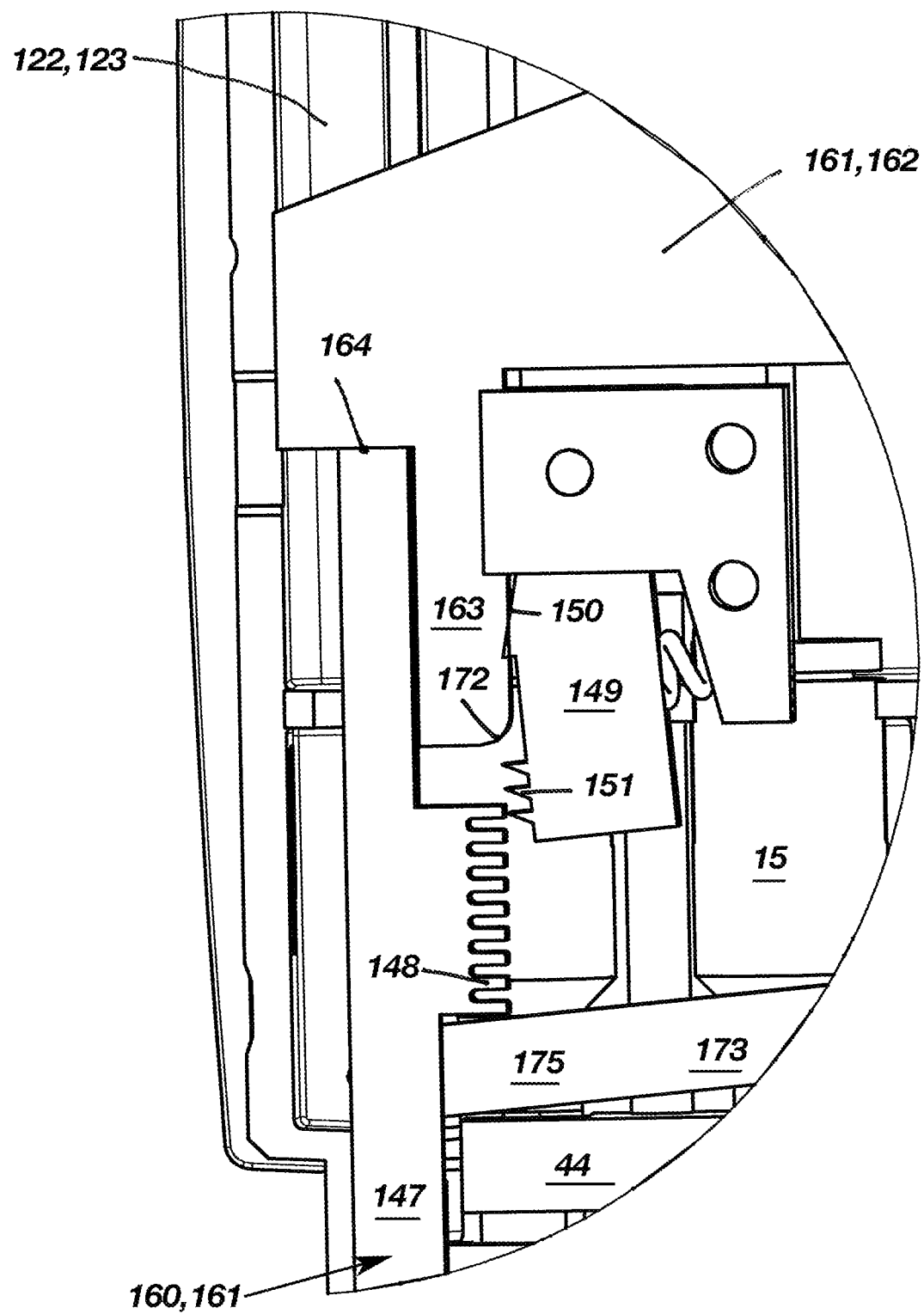
FIG. 15 shows an enlarged detail from FIG. 14.

Then, by actuating the metering head 185, liquids are drawn into the pipette tips 43 and dispensed therefrom (FIG. 17). Once the meterings have been performed, the pipette tips 43 can be ejected together. For this, the metering head 185 is pressed to the maximum so that the ejector sleeve 182 presses the transmission elements 168 of the second ejector part 162 downward, and the ejector rods 163 press against the first wedge elements 150 and disengage the pawls 149 (FIG. 14, 15). Upon further displacing the second ejector part 162 downward, the lateral protrusions 164 press against the top ends of the racks 147 and move them downward into the starting position in FIG. 10. This relieves the pressure plate 44, and the stop plate 75 scrapes the pipette tips 43 off of the attachments 42.

Figure 18:
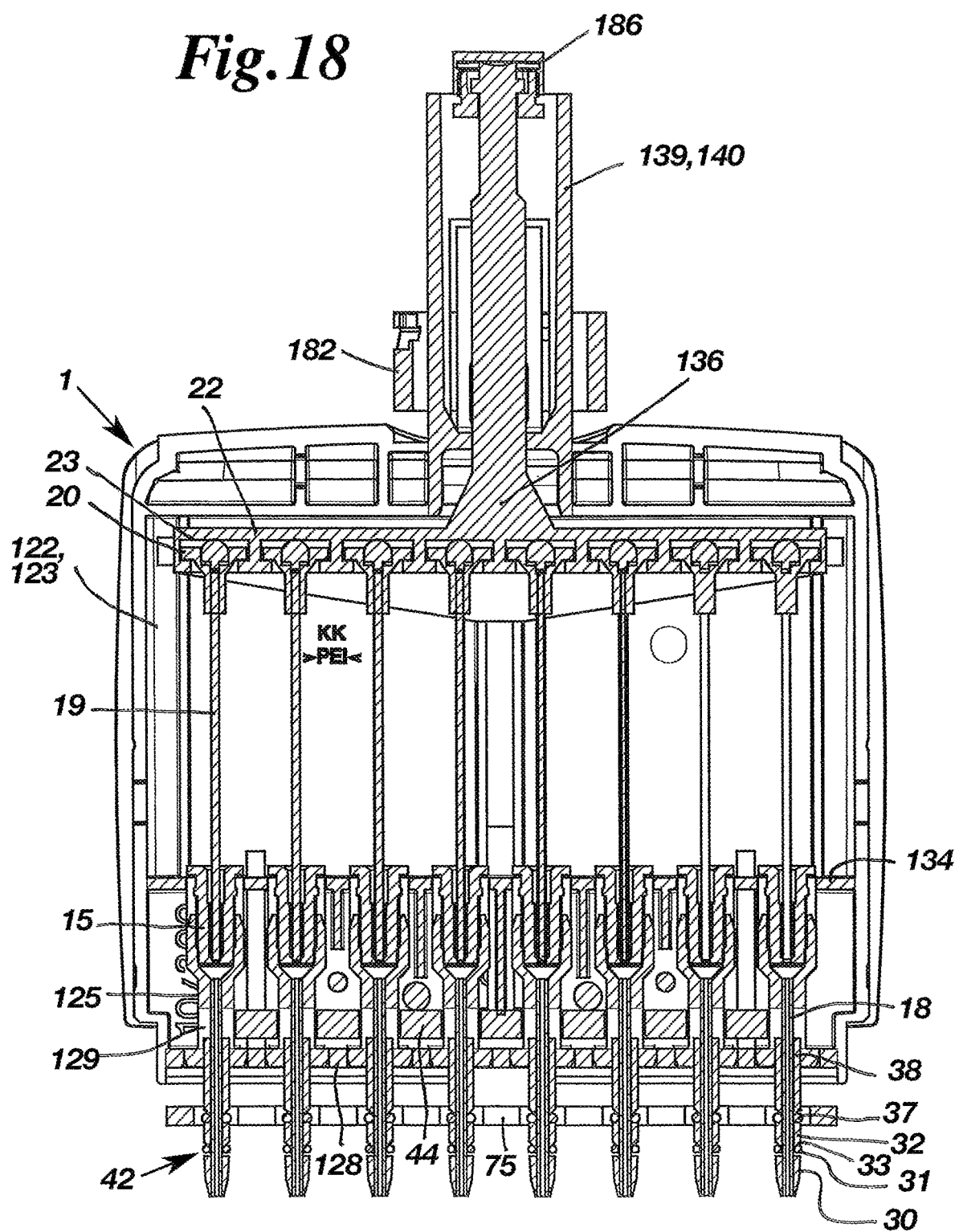
FIG. 18 shows a vertical section of another metering head.
Figure 19:
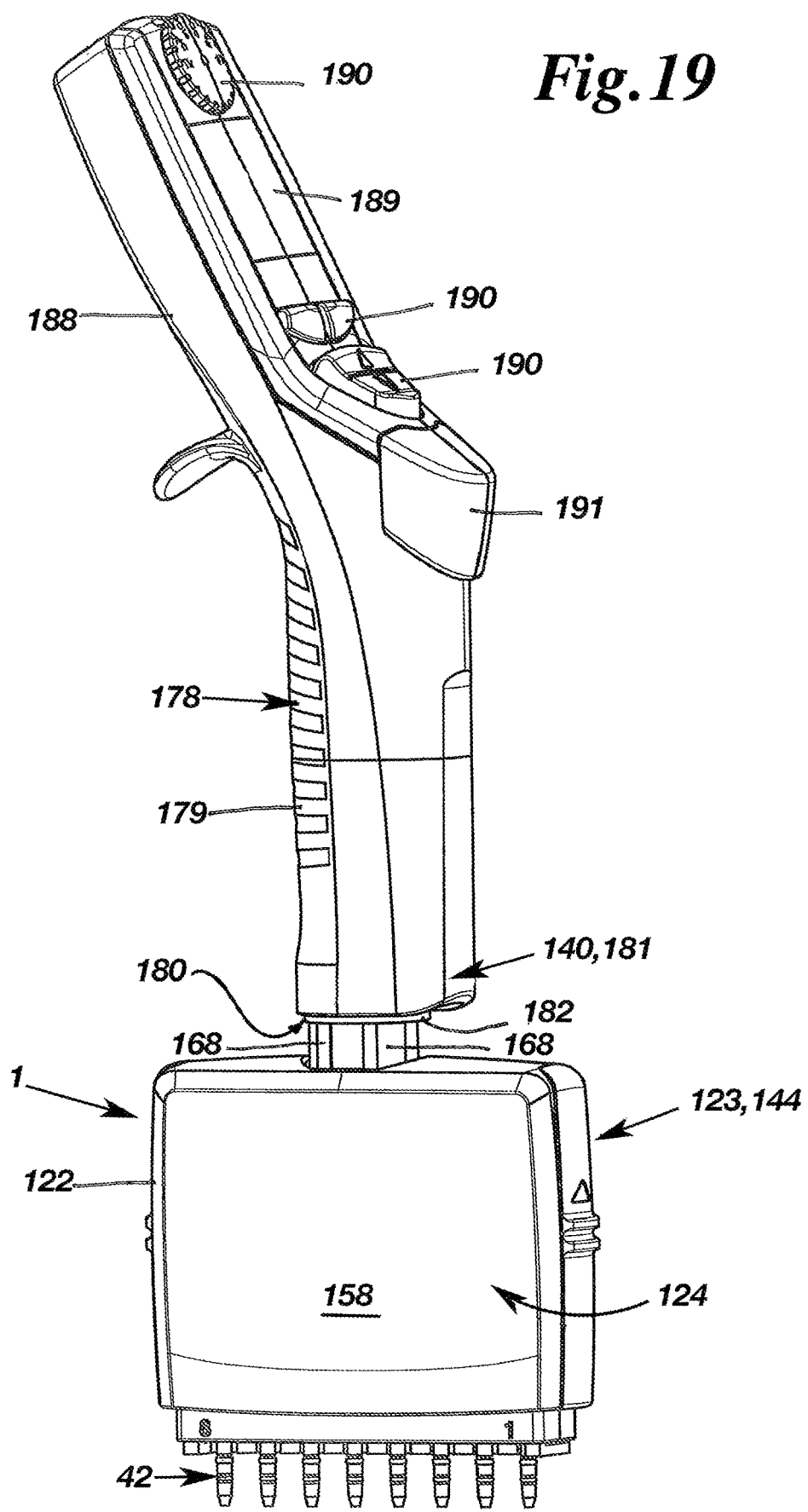
FIG. 19 shows the metering head on an electronic manual pipette in a perspective view diagonally from the rear.

The exemplary embodiment in FIGS. 18 and 19 differs from that described above in that the shifting of the plungers 16 is driven electrically. Since the electrical drive causes the downward and upward shifting of the plungers 16, there is no second helical spring 142 between the rod 135 and the first housing 122. Furthermore at the top end of the rod 135, there is a pot-shaped first magnetic coupling element 186 for coupling to a corresponding second magnetic coupling element of the pipette top part 178.

The pipette top part 178 has a housing top part 179 with a handle-shaped grip section 187 and a pipette head 188 that is angled thereto. In the pipette head 188, there are a display 189 and control elements 190 such as buttons and a dial. Above this, an ejector button 191 is arranged in the transitional region between the pipette head 188 and grip section 187.

In this exemplary embodiment as well, the metering head 1 is releasably connected to the pipette top part 178 by first and second means for releasably connecting 140, 181. The transmission elements 168 also lie on the bottom edge of the ejector sleeve 182. The drive system of the pipette top part 178 is coupled to the plunger 16 by the first and second magnetic coupling elements 186. The ejection of the pipette tips 43 is controlled by the ejector button 191 that is connected by a corresponding mechanism to the ejector sleeve 182.

The pipette tips 43 are otherwise clamped on as in the above-described exemplary embodiment. To draw and dispense liquids, the control elements 190 for setting metering parameters and operating modes and for controlling plunger movements are correspondingly actuated.

REFERENCE SIGN LIST

1 Metering head
2 Carrier
3 Carrier plate
4 Carrier housing
5 Floor wall
6 Side wall
7 Side wall
8 Side wall
9 Side wall
10 Studs
11 (First) threaded hole
12 (Second) threaded hole
13 (Third) threaded hole
14 plunger/cylinder unit
15 Cylinder
16 plunger
17 External thread
18 Pipe
19 Plunger rod
20 Plunger head
21 Annular groove
22 plunger plate
23 Channel
24 Channel wall
25 Channel shoulder
26 Slotted opening
27 Face opening
28 Fastening pins
29 Threaded nut
30 Supporting projection
31 (First) O-ring
32 (First) sleeve
33 (First) tapering
34 (First) end
35 Collar
36 (First) face
37 (Second) O-ring
38 (Second) sleeve
39 (Second) tapering
40 (Second) face
41 Spacing ring
42 Attachment
43 Pipette tip
44 Pressure plate
45 (First) holes
46 Tube
47 Syringe opening
48 Mounting opening
49 Sealing seat
50 Expansion
51 (First) shifting apparatus
52 Guide shaft
53 Recirculating ball gear
54 (First) through-holes
55 (Second) through-holes
56 Gate element
57 Gate base
58 Gate
59 (First) bearing block
60 (First) ball bearing
61 (First) shaft
62 Eccentric disc
63 Eccentric
64 (Second ball bearing)
65 (First) worm wheel
66 (Second) shaft
67 (First) screw
68 (Second) bearing block
69 (Second) worm wheel
70 (Second) screw
71 Motor shaft
72 Electric motor
73 Eccentric gearing
74 (Second) shifting apparatus
75 Stop plate
76 (Second) holes
77 (Third) shifting apparatus
78 Transmission shaft
79 Threaded hole
80 Rocker arm
81 Ejection shaft
82 (Third) through-hole
83 (Fourth) threaded hole
84 Spring element
85 Guide rod
86 (Fifth) threaded hole
87 Plate
88 (First) helical spring
91 (Top) pin section 92 Connecting element
93 Bayonet connection
94 (Middle) pin section
95 (Bottom) pin section
96 (Central) hole
97 Longitudinal groove
98 Wing
99 Spindle
100 Bearing pin
101 (Third) ball bearing
102 Bearing bushing
103 Bearing carrier
104 Tab
105 Threaded pin
106 Driver
107 Slot
108 Cylindrical pin
109 Groove
110 Three-axis transfer unit
111 Metering machine
112 Pin holder
113 (First) plug-in connection
114 (Second) plug-in connection
115 Power supply
116 Control apparatus
117 Holder
118 Storage container
119 Wells
120 Microtiter plate
121 Waste container
122 (First) housing
123 (Front) housing shell
124 (Rear) housing shell
125 Pin
126 Circular disk
127 (Fourth) through-hole
128 (Bottom) housing wall
129 Flattening
130 (Fifth) through-hole
131 Projection
132 Through-channel
133 (Sixth) through-hole
134 Support plate
135 Rod
136 Plunger actuator
137 Contact surface
138 (Top) housing wall
139 Retaining element
140 (First) means for detachable connection
141 abutment element
142 (Second) helical spring
143 Cutout
144 (Front) housing wall
145 Guide hole
146 Guide pin
147 Toothed rack
148 (First) teeth
149 Pawl
150 (First) wedge element
151 (Second) teeth
152 (First) shaft
153 (First) leg
154 Bearing carrier
155 (Second) leg
156 Eye
157 Holding pin
158 (Rear) housing wall
159 (Third) helical spring
160 (First) ejector part
161 Ejector
162 (Second) ejector part
163 Ejector rod
164 Projection
165 Actuating element
166 (First) recess
167 (First) abutment
168 Transmission element
169 Slot
170 (Second) abutment
171 (Fourth) helical spring
172 (Second) wedge element
173 Angle lever
174 (Second) shaft
175 (First) lever arm
176 (Second) lever arm
177 (Second) recess
178 Pipette top part
179 (Second) housing
180 Housing opening
181 (Second) means for detachable connection
182 Ejector sleeve
183 (First) drive apparatus
184 (Second) drive apparatus
185 Metering button
186 (First) magnetic coupling element
187 Grip section
188 Pipette head
189 Display
190 Operating element
191 Ejector button

The invention claimed is:

1. A metering head for a metering machine or another metering device, comprising:
a carrier, on which a plurality of parallel attachments for picking up pipette tips are arranged adjacent to each other, wherein each of said plurality of parallel attachments comprises:
a tube which has an at least partially peripheral supporting protrusion that projects at a tube bottom end from a tube outer perimeter,
at least one sleeve which surrounds the tube, the at least one sleeve being constructed and arranged to be axially shifted on the tube;
at least one elastomer O-ring surrounding the tube, the at least one elastomer O-ring being adjacent to a sleeve bottom end of the at least one sleeve;
a pressure plate positioned above the at least one sleeve, the pressure plate having a plurality of first holes, the tube of each of the plurality of parallel attachments extending through one of the plurality of first holes, wherein the pressure plate is shifted along the tube between a release position at a first distance from the at least partially peripheral supporting protrusion and a clamping position at a second distance from the at least partially peripheral supporting protrusion, the second distance being smaller than the first distance, the pressure plate pressing against an upper edge of each of the at least one sleeve on each of the plurality of parallel attachments in the clamping position whereby each of the at least one sleeve is pressed, at each sleeve bottom end, against the at least one elastomer O-ring, and each of the at least one elastomer O-ring are expanded in order to securely clamp the pipette tips shoved onto each of said plurality of parallel attachments; and a shifter connected to the pressure plate, the shifter being constructed and arranged to move the pressure plate between the release position and the clamping position.

2. The metering head according to claim 1, the at least one sleeve comprising a first sleeve and a second sleeve surrounding the tube above the first sleeve, said second sleeve being constructed and arranged to be axially shifted on the tube.

3. The metering head according to claim 2, the at least one elastomer O-ring comprising a first O-ring and a second O-ring, the second O-ring surrounding surrounds the tube, the second O-ring being arranged adjacent to a second bottom end of the second sleeve, and the second O-ring adjoins the first sleeve at the second bottom end of the second sleeve.

4. The metering head according to claim 2, wherein the first sleeve and the second sleeve can be shifted between the release position at the first distance from the at least partially peripheral supporting protrusion and the clamping position at the second distance from the at least partially peripheral supporting protrusion.

5. The metering head according to claim 3, wherein, the second end of the second sleeve is pressed into the second O-ring, and a tapering of the first sleeve being pressed into the first O-ring, and the first O-ring and the second O-ring are expanded in order to securely clamp the pipette tips shoved onto each of the plurality of parallel attachments, and wherein the shifter is coupled to the first sleeve and the second sleeve of each of the plurality of parallel attachments, the shifter positioning the first sleeve and the second sleeve between the release position and the clamping position.

6. The metering head according to claim 2, wherein the shifter is constructed and arranged to displace the first sleeve and the second sleeve, and wherein the pressure plate is pressed against a top edge of the second sleeve.

7. The metering head according to claim 1, wherein the at least one sleeve has a peripheral tapering at the sleeve bottom end.

8. The metering head according to claim 1, wherein the shifter or the shifter and the pressure plate adjoins the carrier.

9. The metering head according to claim 3, wherein an inner diameter of the first O-ring is less than a second O-ring inner diameter of the second O-ring, and an outer diameter of the first O-ring is less than a second O-ring outer diameter of the second O-ring.

10. The metering head according to claim 3, wherein the first O-ring is guided on an outer perimeter on the tube, and the second O-ring is guided on an inner perimeter of the second bottom end of the second sleeve engaging therein.

11. The metering head according to claim 1, wherein the shifter has at least one guide shaft that is connected at a shifter bottom to the pressure plate and is coupled at a shifter top by an eccentric gearing to an electric motor.

12. The metering head according to claim 11, wherein four guide shafts are connected at the shifter bottom to the pressure plate, and are coupled at the shifter top by the eccentric gearing to the electric motor.

13. The metering head according to claim 11, wherein each of the at least one guide shaft is mounted in a recirculating ball bearing that is held in the carrier.

14. The metering head according to claim 11, wherein each of the at least one guide shaft has a gate that extends at a guide shaft top end perpendicular to the at least one guide shaft, the eccentric gearing is on a first shaft oriented perpendicular to the at least one guide shaft and the gate, the eccentric gearing engaging the gate, and the first shaft is coupled to the electric motor.

15. The metering head according to claim 14, wherein the eccentric gearing bears a ball bearing that is guided in the gate.

16. The metering head according to claim 14, wherein the electric motor is coupled by a first gearing to the first shaft.

17. The metering head according to claim 11, wherein the electric motor is coupled to an electric control apparatus that controls the electric motor such that the pressure plate can be shifted between the release position and the clamping position.

18. The metering head according to claim 11, wherein the electric motor has a motor shaft coupled to a rotary encoder that is connected to an electric control apparatus which determines a position of the pressure plate depending on a rotational position of the motor shaft of the electric motor detected by the rotary encoder.

19. The metering head according to claim 1, wherein a stop plate is arranged below the pressure plate and has a plurality of second holes through which the plurality of parallel attachments extend in order to shove pipette tips on the plurality of parallel attachments until contact with the stop plate.

20. The metering head according to claim 19, wherein a shifting assembly is connected to the stop plate and is constructed and arranged to shift the stop plate between a stop position at the first distance from the at least partially peripheral supporting protrusion and an ejection position at the second distance from the at least partially peripheral supporting protrusion in order to shove pipette tips on the plurality of parallel attachments in the stop position until contacting the stop plate, and to eject the pipette tips from the plurality of parallel attachments by shifting the stop plate from the stop position to the ejection position.

21. The metering head according to claim 20, wherein the shifting assembly comprises a plurality of rocker arms that are pivotably mounted on the carrier, a plurality of transmission shafts that are securely connected to the pressure plate and project upward therefrom, each of said plurality of transmission shafts lying against one end of one of said plurality of rocker arms, and a plurality of ejection shafts which are securely connected to the stop plate and each of said plurality of ejection shafts lie against another end of one of said plurality of rocker arms so that when the pressure plate is lifted, the plurality of transmission shafts pivot the plurality of rocker arms, and press the stop plate via the plurality of ejection shafts out of the stop position into the ejection position.

22. The metering head according to claim 1, wherein a spacing ring surrounds the tube and is shiftably arranged on the tube next to the pressure plate, and the pressure plate exerts pressure against the upper edge of the at least one sleeve through the spacing ring.

23. The metering head according to claim 2, wherein the first sleeve and the second sleeve each have a flat face proximate to a sleeve top against which the pressure plate, or an elastomer second O-ring, or a spacing ring lies.

24. The metering head according to claim 1, wherein the shifter comprises:
  a stop plate that is arranged below the pressure plate having a plurality of second holes through which the plurality of parallel attachments extend, the stop plate being displaceable between a stop position at the first distance from the at least partially peripheral supporting protrusion, and an ejection position at the second distance from the at least partially peripheral supporting protrusion, and a gearing that is coupled to the stop plate and the pressure plate, wherein the gearing is constructed and arranged to shift the pressure plate from the release position into the clamping position when the stop plate is shifted from the ejection position into the stop position, wherein the metering head comprises:

a latching assembly having at least one first latch connected to the stop plate, and at least one second latch connected to the carrier, wherein the at least one first latch and the at least one second latch are constructed and arranged to latch with each other when the pressure plate is arranged in the clamping position, and an unlatching assembly having at least one unlatching element and an ejector connected to the at least one unlatching element, wherein the unlatching assembly is constructed and arranged to disconnect a latching connection between the at least one first latch and the at least one second latch when the ejector is shifted from a starting position into an unlatched position.

25. The metering head according to claim 24, wherein the gearing is a lever gearing that comprises two angle levers that are pivotably mounted on the carrier, the two angle levers lie with a first lever arm end of a first lever arm at a first lever arm distance from a second lever arm on a pressure plate top side of the pressure plate, and the first lever arm and the second lever arm are coupled with a second lever arm end of the second lever arm at a second lever arm distance from the first lever arm to the stop plate.

26. The metering head according to claim 24, wherein the at least one first latch is a rack that projects vertically upward from the stop plate, and the at least one second latch is a pawl that is pivotably mounted on the carrier and pretensioned by a spring toward the rack, and latches in the rack upon displacing the stop plate in an upward direction.

27. The metering head according to claim 26, wherein the unlatching assembly comprises at least one wedge gear that has a first wedge on the pawl sharply angled to the vertical, and/or a second wedge on the ejector sharply angled to the vertical, wherein the ejector is shiftably guided on the carrier in a vertical direction on guides such that, by shifting the ejector in a vertical direction, the ejector and the pawl are brought into engagement with each other by at least one of the first wedge and the second wedge, whereby the pawl is lifted out of teeth of the rack.

28. The metering head according to claim 24, wherein a first ejector part comprises the stop plate and two racks that project upward from the stop plate, and a second ejector part in the form of a cross-member, and an actuator that projects vertically upward, wherein the first ejector part and second ejector part have first and second stop elements which contact each other after the unlatching of the first and second latches, whereby the second ejector part entrains the first ejector part upon being shifted in a downward direction.

29. The metering head according to claim 1, wherein the plurality of parallel attachments are inserted in pipette tips, and the pipette tips are securely clamped by expanding the at least one elastomer O-ring on the plurality of parallel attachments.

30. The metering device according to claim 29, wherein the metering head is held on a three-axis transfer unit, the three-axis transfer unit shifting the metering head along three axes in space.

* * * * *